US012041410B2

(12) United States Patent
Zalisk et al.

(10) Patent No.: US 12,041,410 B2
(45) **Date of Patent: *Jul. 16, 2024**

(54) EAR TIPS AND RELATED DEVICES AND METHODS

(71) Applicant: Bose Corporation, Framingham, MA (US)

(72) Inventors: Michael Andrew Zalisk, Arlington, MA (US); Donna Marie Sullivan, Millbury, MA (US); Kai Gao, Marlborough, MA (US); Shawn J. Prevoir, Northborough, MA (US); Brian David Beaudoin, Medway, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,079

(22) Filed: Jan. 30, 2023

(65) Prior Publication Data

US 2023/0179908 A1 Jun. 8, 2023

Related U.S. Application Data

(63) Continuation of application No. 17/371,483, filed on Jul. 9, 2021, now Pat. No. 11,582,549.

(51) Int. Cl.
*H04R 1/10* (2006.01)

(52) U.S. Cl.
CPC ......... *H04R 1/1083* (2013.01); *H04R 1/1016* (2013.01); *H04R 1/1066* (2013.01)

(58) Field of Classification Search
CPC .. H04R 1/2873; H04R 25/652; H04R 1/1058; H04R 1/2869; H04R 1/1041; H04R 25/554; H04R 25/456; H04R 9/027; H04R 1/1016; H04R 2460/11; H04R 2460/15; H04R 25/654; H04R 1/1083; H04R 1/1066; H04R 1/1033; H04R 1/1075
See application file for complete search history.

(56) References Cited

U.S. PATENT DOCUMENTS

| | | | | |
|---|---|---|---|---|
| 6,129,174 A * | 10/2000 | Brown | H04R 25/656 381/325 |
| 11,582,549 B2 * | 2/2023 | Zalisk | H04R 25/652 |
| 2017/0094388 A1 * | 3/2017 | Huwe | H04R 1/1016 |
| 2018/0030263 A1 * | 2/2018 | Gu | C08L 53/025 |
| 2018/0109861 A1 * | 4/2018 | Prevoir | H04R 1/1091 |
| 2019/0284358 A1 * | 9/2019 | Prevoir | C08J 7/123 |
| 2021/0076145 A1 * | 3/2021 | Junke | H04R 1/1016 |
| 2021/0094249 A1 * | 4/2021 | Slabaugh | B29C 71/04 |
| 2022/0010127 A1 * | 1/2022 | Xu | B32B 27/32 |

* cited by examiner

*Primary Examiner* — Carolyn R Edwards
*Assistant Examiner* — Julie X Dang

(57) ABSTRACT

An ear tip includes a body configured to be mounted onto an earbud. The body includes a first end, a second end opposite the first end, and a first wall extending between the first and second ends. The first wall defines and surrounds a hollow passage that is configured to conduct sound waves. The first wall is configured to engage a nozzle on the earbud. The first wall includes a ring that is formed of a rigid material and engages the nozzle. The ring includes at least one C-shaped member with at least one gap and a compliant material is molded around the ring and fills the gap.

22 Claims, 31 Drawing Sheets

EAR TIPS AND RELATED DEVICES AND METHODS

CROSS-REFERENCE TO RELATED APPLICATIONS

This application is a Continuation of U.S. patent application Ser. No. 17/371,483 filed Jul. 9, 2021, and titled "Ear Tips and Related Devices and Methods," which application is herein incorporated by reference in its entirety.

BACKGROUND

This disclosure relates to ear tips and related devices and methods.

Modern in-ear headphones offer active noise reduction, which helps to reduce ambient noise at the user's ear canals. Active noise reduction is generally achieved through the use of analog circuits or digital signal processing. Adaptive algorithms are designed to analyze the waveform of the ambient noise, then, based on the specific algorithm, generate a signal that will either phase shift or invert the polarity of the original signal. This inverted signal (in antiphase) is then amplified and a transducer (speaker) creates a sound wave directly proportional to the amplitude of the original waveform, creating destructive interference. This effectively reduces the volume of the perceivable noise.

An important compliment to this active noise reduction is passive attention of noise which is provided by the materials that seal the user's ear canal. In that regard, many modern in-ear headphones include a compliant eartip typically made from a low durometer silicone. These eartips form an acoustic seal with the user's ear canal and act as a physical barrier to the transmission of ambient noise. The low durometer silicone provides comfort because it is soft and compliance that helps to ensure a good acoustic seal with the user's ear canal.

While active noise reduction is very effective at lower frequencies (e.g., 20 Hz to 1 kHz), the headphones rely heavily on passive attention to attenuate (reduce) higher frequency noise (e.g., 1 kHz and above). Unfortunately, the low durometer silicone that is commonly used for the eartips is not particularly good at attenuating high frequencies in the 1 kHz to 1.5 kHz range. This can allow some undesired noise to pass through the ear tip material and into the user's ear canal.

This disclosure relates to eartips for headphones with improved passive attenuation. This disclosure further relates to an eartip that is designed to mate with an oblong nozzle and which is configured to resist rotation about the nozzle once it is mated thereto.

SUMMARY

All examples and features mentioned below can be combined in any technically possible way.

In one aspect, an ear tip includes a body that is configured to be mounted onto an earbud. The body includes a first end, a second end opposite the first end, and an inner wall that extends between the first end and the second end. The inner wall defines and surrounds a hollow passage that is configured to conduct sound waves. The body also includes an outer wall that is connected to the inner wall at the first end and extends away from the inner wall toward the second end. The inner wall has an oblong cross-sectional shape that is configured to accommodate a corresponding nozzle on the earbud. The inner wall includes a ring that is formed of a rigid material and engages and conforms to the oblong shape of the nozzle, which inhibits improper mounting of the ear tip on the nozzle and inhibits rotation of the ear tip relative to the nozzle once it is mounted on the nozzle.

Implementations may include one of the following features, or any combination thereof.

In some implementations, the inner wall includes a high durometer compliant material that defines at least part of an extension that extends between the nozzle and the first end of the ear tip.

In certain implementations, the outer wall is molded around the high durometer compliant material, wherein the outer wall is formed of a lower durometer compliant material.

In some cases, the ring includes at least one C-shaped member with at least one gap, and wherein the high durometer compliant material is molded around the ring and fills the gap.

In certain cases, the ring includes a pair of C-shaped members arranged with a pair of gaps between the members, and wherein the high durometer compliant material fills both gaps.

In some examples, the high durometer compliant material defines a retention member that is configured to engage a mating retention member on the nozzle.

In certain examples, the ring defines a recess that extends around an inner surface of the inner wall and is configured to receive an O-ring that is seated within a corresponding recess that is formed in and extends around an outer surface of the nozzle.

In some implementations, the inner wall also includes an extension that extends between the nozzle and the first end of the ear tip, and the outer wall and the extension are formed at least partially of a viscoelastic material with frequency stiffening behavior, In certain implementations, the extension and the outer wall are formed of a styrenic TPE with viscoelastic attributes (e.g., A9 TPE).

In some cases, an outer surface of the outer wall is treated with a surface treatment selected from an E-beam processing and photoionization for improved sebum resistance.

In certain cases, an outer surface of the outer wall has a soft touch coating.

In some examples, the soft touch coating is a 50% poly(styrene-isobutylene-styrene) (SIBS) block copolymer/50% silicone (wt/wt) soft touch coating.

In certain examples, the viscoelastic material is a composition including an elastomer and one or more phase change materials having a phase change ability from solid to liquid state at a predetermined phase-change temperature In some implementations, the predetermined phase-change temperature is about 25° C. to about 35° C.

In certain implementations, the composition has a hardness of about 5 Shore A to about 50 Shore A, and the amount of the phase change material in the composition is about 10% to about 40% by weight.

In another aspect, an ear tip includes a body that is configured to be mounted onto an earbud. The body includes a first end, a second end opposite the first end, and an inner wall that extends between the first end and the second end. The inner wall defines and surrounds a hollow passage that is configured to conduct sound waves. The body also includes an outer wall that is connected to the inner wall at the first end and extends away from the inner wall toward the second end. The inner wall is configured to engage a nozzle on the earbud. The inner wall includes an extension that extends between the nozzle and the first end of the ear tip, and wherein the outer wall and the extension are formed at least partially of a viscoelastic material comprising a styrenic TPE with viscoelastic attributes (e.g., an A9 TPE).

Implementations may include one of the above and/or below features, or any combination thereof.

In some implementations, an outer surface of the outer wall is treated with a surface treatment selected from an E-beam processing and photoionization for improved sebum resistance.

In certain implementations, an outer surface of the outer wall has a soft touch coating.

In some cases, the soft touch coating is a 50% SIBS/50% silicone (wt/wt) soft touch coating.

In certain cases, the viscoelastic material is a composition comprising the styrenic TPE with viscoelastic attributes and one or more phase change materials having a phase change ability from solid to liquid state at a predetermined phase-change temperature.

In some examples, the predetermined phase-change temperature is about 25° C. to about 35° C.

In certain examples, the composition has a hardness of about 5 Shore A to about 50 Shore A, and the amount of the phase change material in the composition is about 10% to about 40% by weight.

In some implementations, the viscoelastic material defines a retention member that is configured to engage a mating retention member on the nozzle.

In certain implementations, the inner wall also includes a ring formed of a rigid plastic and configured to engage the nozzle.

In some cases, the ring defines a recess that extends around an inner surface of the inner wall and is configured to receive an O-ring that is seated within a corresponding recess that is formed in and extends around an outer surface of the nozzle.

In certain cases, the styrenic TPE with viscoelastic attributes is an A9 TPE.

Another aspect features an ear tip that includes a body that is configured to be mounted onto an earbud. The body includes a first end, a second end opposite the first end, and an inner wall that is formed of a first material having a first durometer. The inner wall extends between the first end and the second end. The inner wall defining and surrounding a hollow passage configured to conduct sound waves. The body also includes an outer wall that is formed of a second material having a second durometer that is less than the first durometer. The outer wall is connected to the inner wall at the first end and extends away from the inner wall toward the second end. The inner wall has an oblong cross-sectional shape that is configured to accommodate a corresponding nozzle on the earbud. The inner wall defines a retention feature that has two end portions and two side portions connecting them. A thickness of the side portions is different than a thickness of the end portions. The retention feature engages and conforms to a complimentary retention feature of the nozzle, which inhibits improper mounting of the ear tip on the nozzle and inhibits rotation of the ear tip relative to the nozzle once it is mounted on the nozzle.

Commonly labeled components in the FIGURES are considered to be substantially equivalent components for the purposes of illustration, and redundant discussion of those components is omitted for clarity. Numerical ranges and values described according to various implementations are merely examples of such ranges and values and are not intended to be limiting of those implementations. In some cases, the term "about" is used to modify values, and in these cases, can refer to that value+/−a margin of error, such as a measurement error, which may range from up to 1-5 percent.

DETAILED DESCRIPTION

Figure 1A:
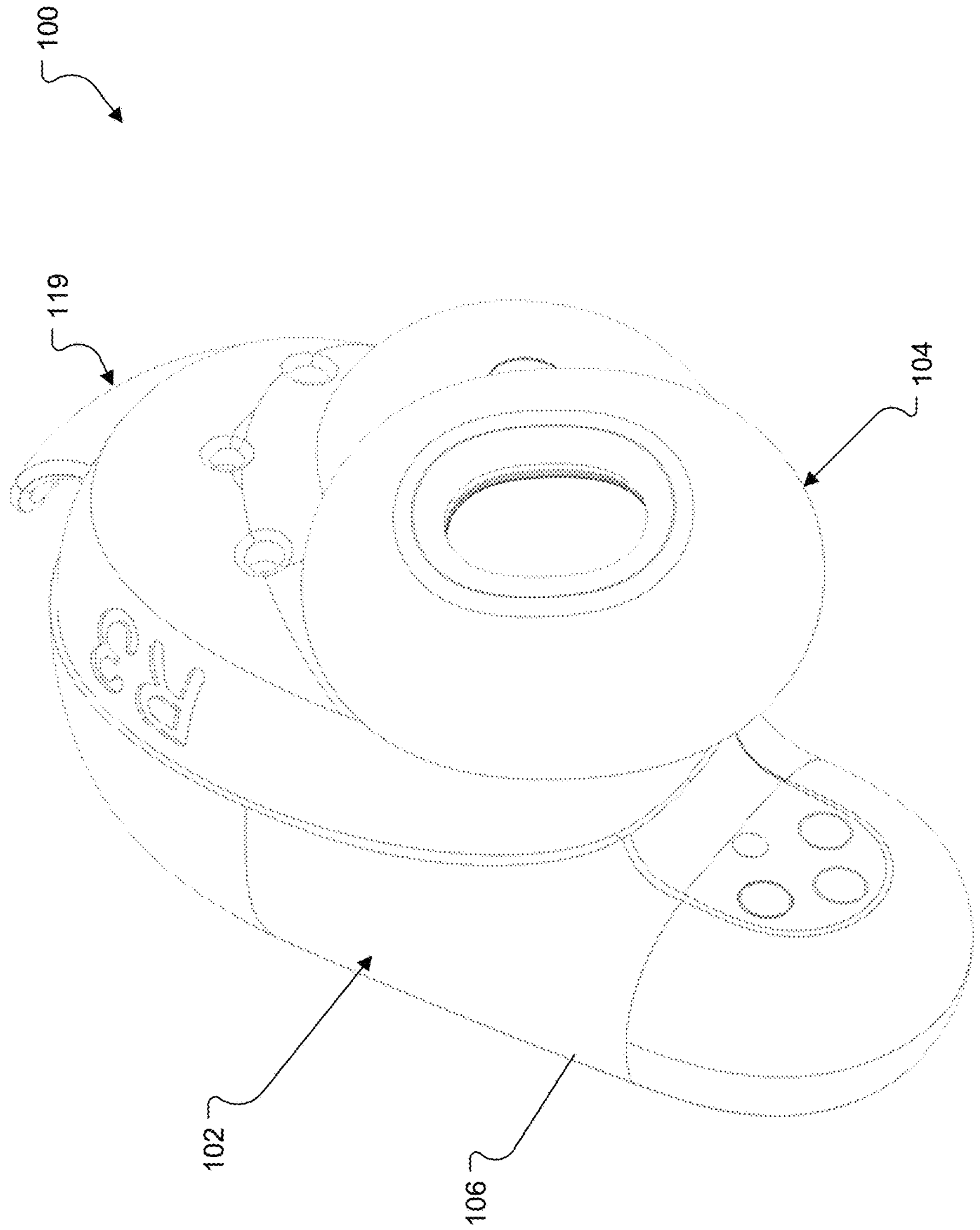
FIG. 1A is a front perspective view of an earpiece.
Figure 1B:
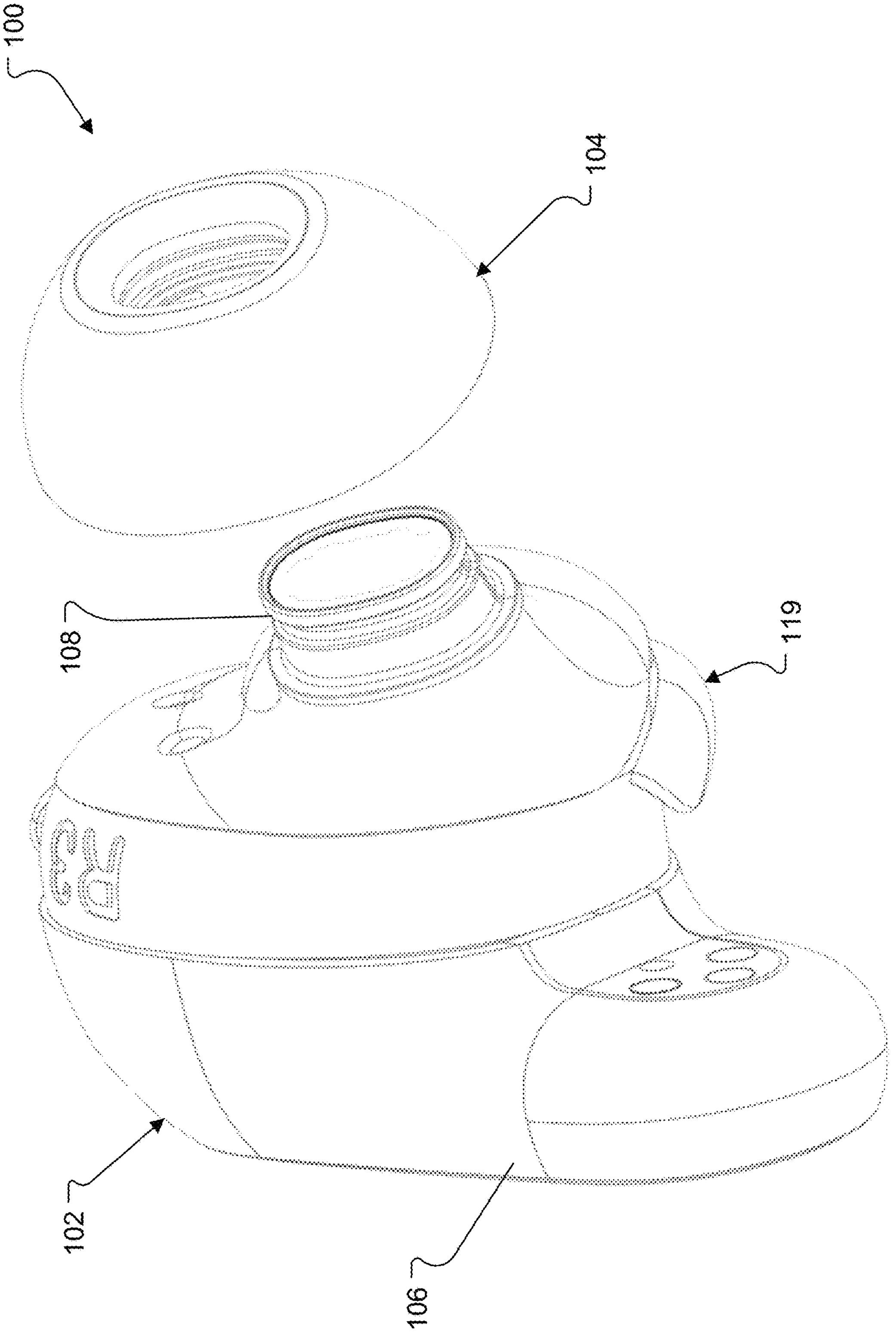
FIG. 1B is an exploded front perspective view of the earpiece of FIG. 1A.
Figure 2:
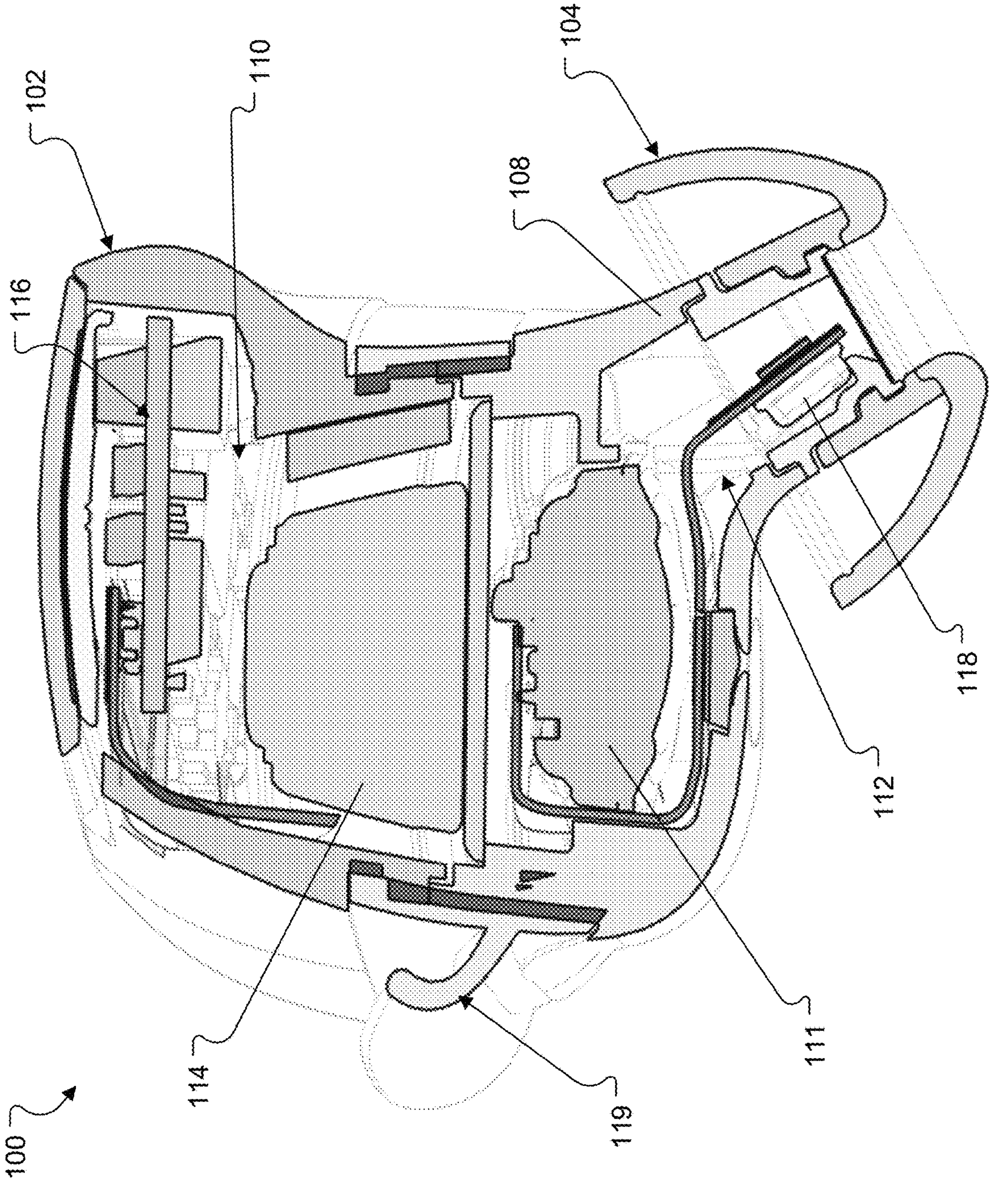
FIG. 2 is a cross-sectional side view of the earpiece of FIG. 1A.

FIGS. 1A, 1B, and 2 show an exemplary earpiece 100 constructed in accordance with this disclosure. The earpiece 100 includes an earbud 102 and an ear tip 104. The earbud 102 includes a housing 106 that defines a nozzle 108 that is configured to be coupled to the ear tip 104. The housing 106 may be formed of, e.g., molded form, a hard plastic such as Acrylonitrile Butadiene Styrene (ABS), Polycarbonate/Acrylonitrile Butadiene Styrene (PCB/ABS), polyetherimide (PEI), or stereolithography (SLA) resin). The housing 106 defines a cavity 110 within which an electro-acoustic transducer 111 (a/k/a "speaker," or "receiver," or "driver"), a battery 114, and electronic circuitry 116 may be disposed. The cavity 110 is acoustically coupled to an acoustic passage 112 in the nozzle 108, e.g., such that the electro-acoustic transducer 111 can be acoustically coupled to a user's ear when the earpiece is worn. The housing 106 may also support one or more microphones 118.

As shown in FIG. 1B, the nozzle 108 has an oblong cross-sectional shape, e.g., the shape of an ellipse, an oval, a racetrack (having parallel sides and rounded ends that extend between the parallel sides, a/k/a "stadium"), or an oblong shape with rounded ends and curved splines connecting them as shown in FIG. 1B. Here, "cross-section" or "cross-sectional" should be understood to be normal to the central axis of the nozzle. This is expected to conform to a user's ear canal better than a simple round cross-section. The earpiece 100 may also include a stability band 119 to assist with retaining the earpiece 100 in the user's ear. Additional details regarding the stability band 119 (a/k/a "in-ear earpiece retaining structure") is described in U.S. patent application Ser. No. 16/883,529, filed May 26, 2020 and titled "In-Ear Earpiece Retaining Structure," the complete disclosure of which is incorporated herein by reference.

Figure 3A:
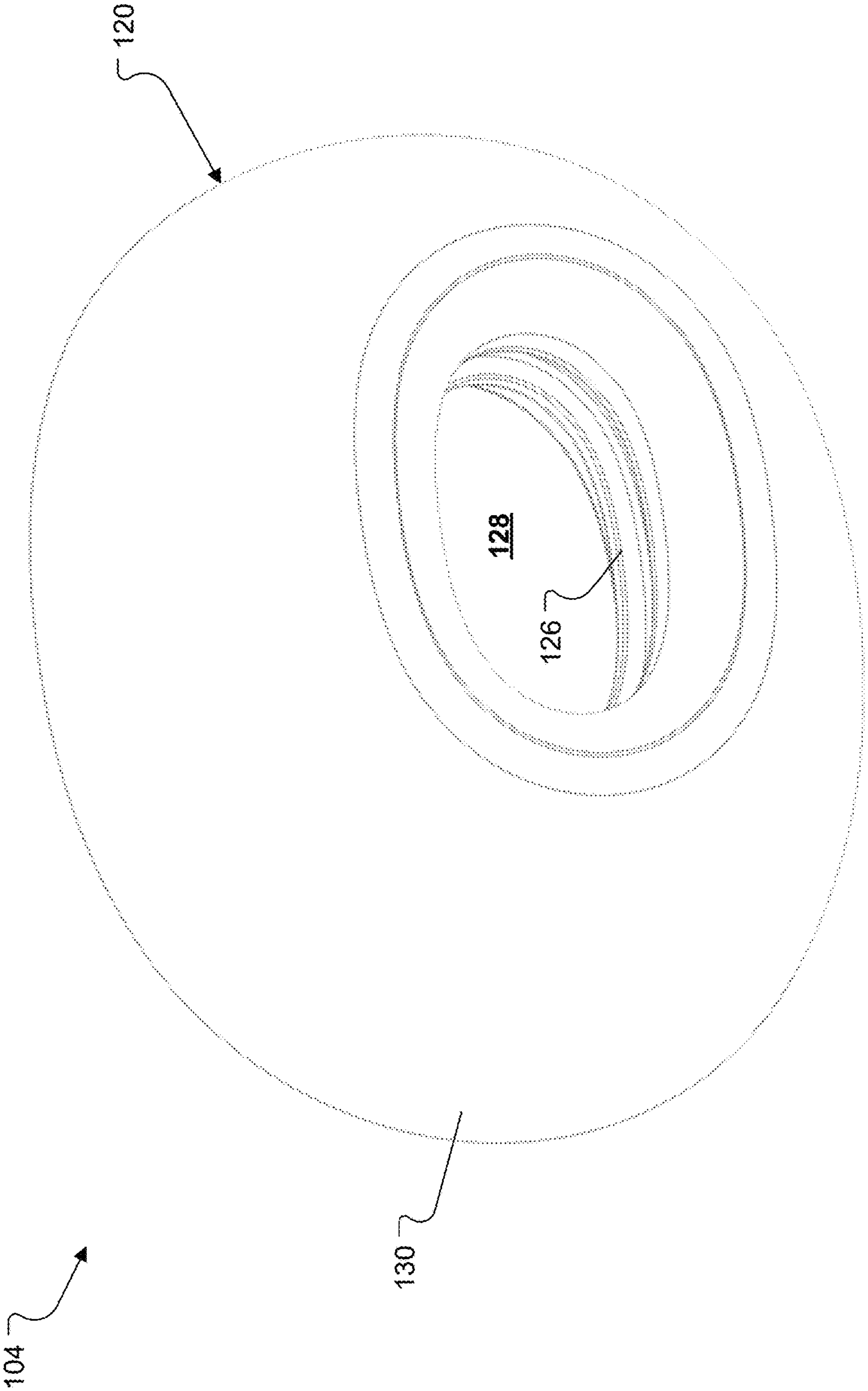
FIG. 3A is a front perspective view of a first implementation of an ear tip according to the present disclosure.
Figure 3B:
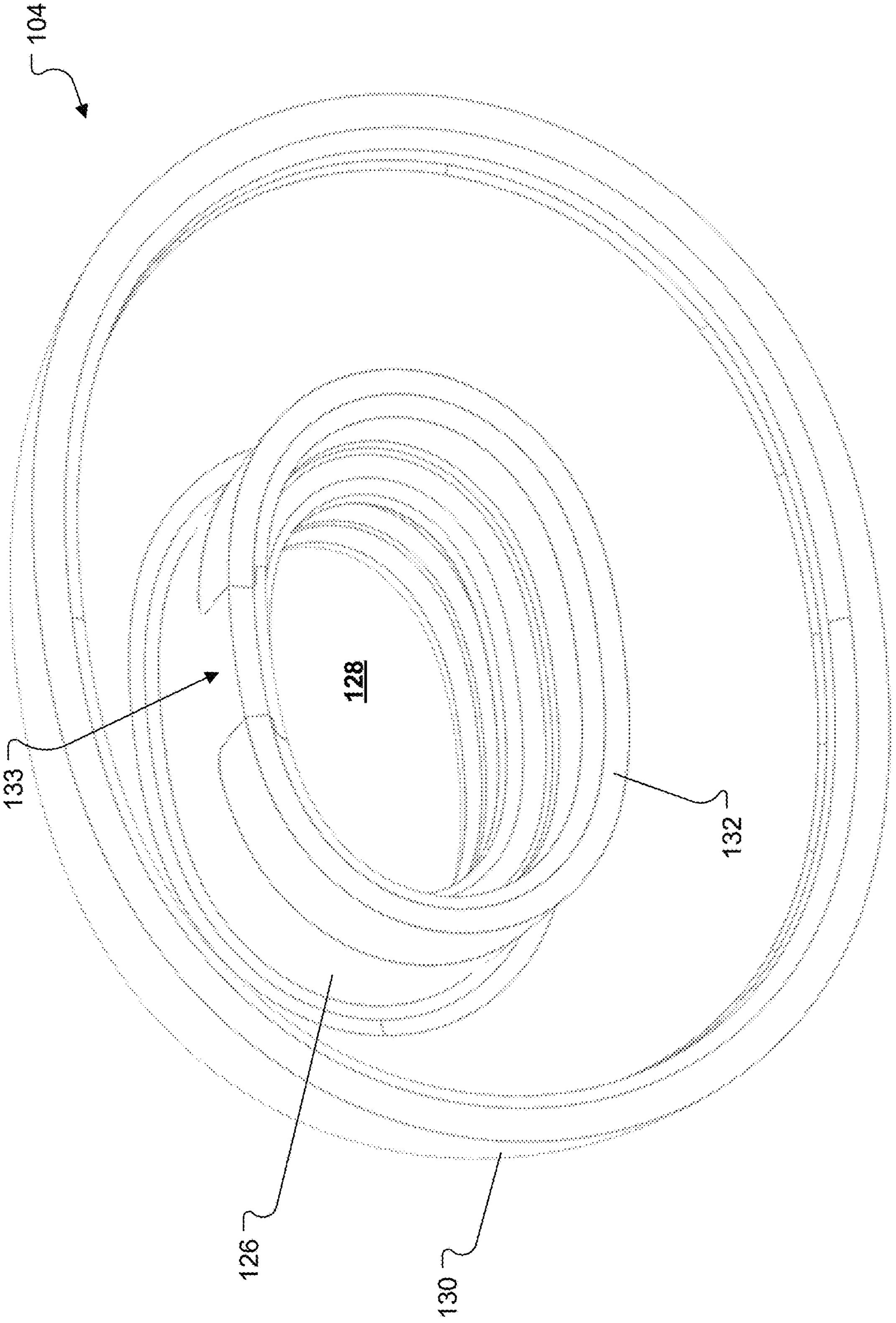
FIG. 3B is a rear perspective view of the ear tip of FIG. 3A.
Figure 3C:
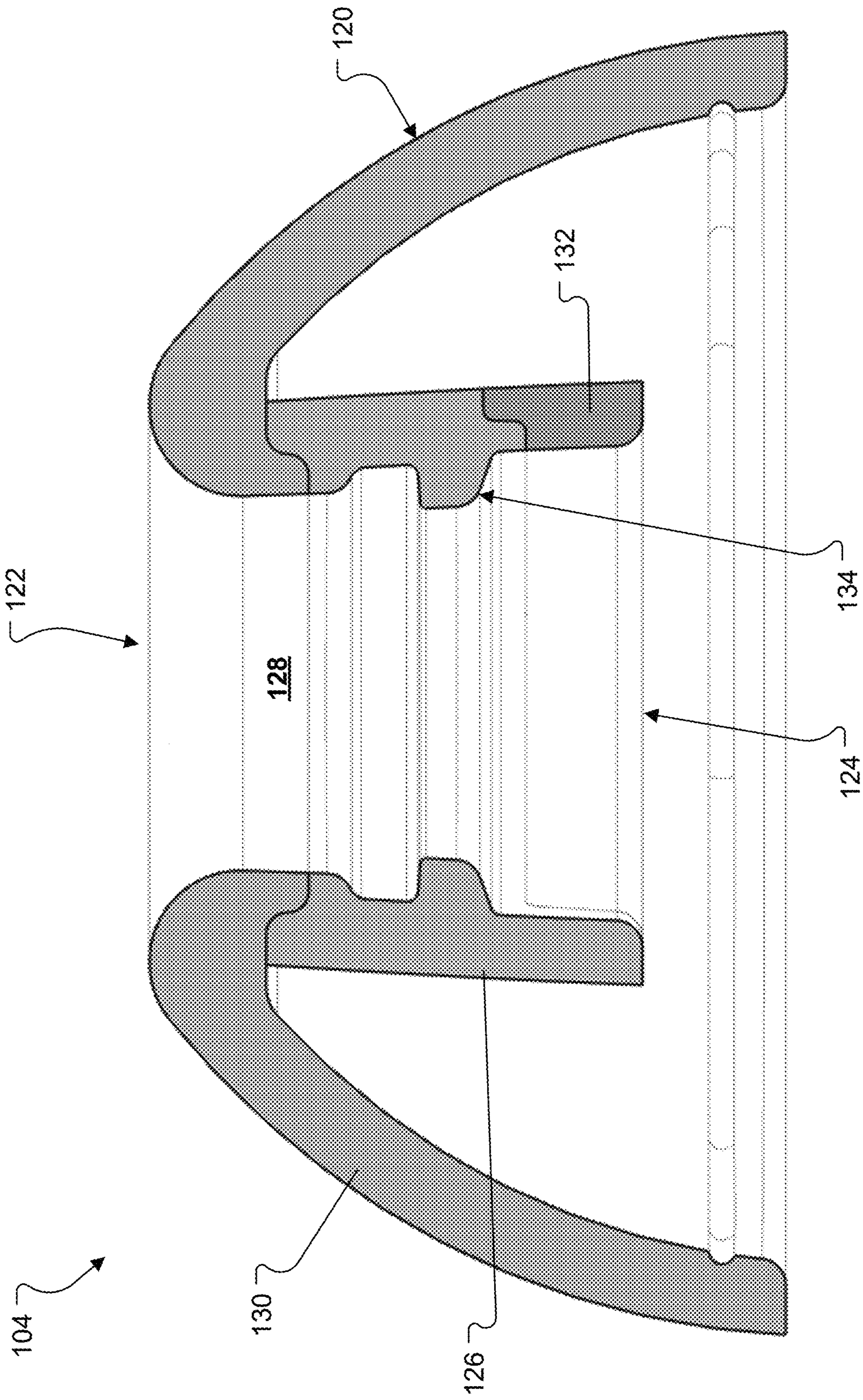
FIG. 3C is a cross-sectional side view of the ear tip of FIG. 3A.
Figure 4:
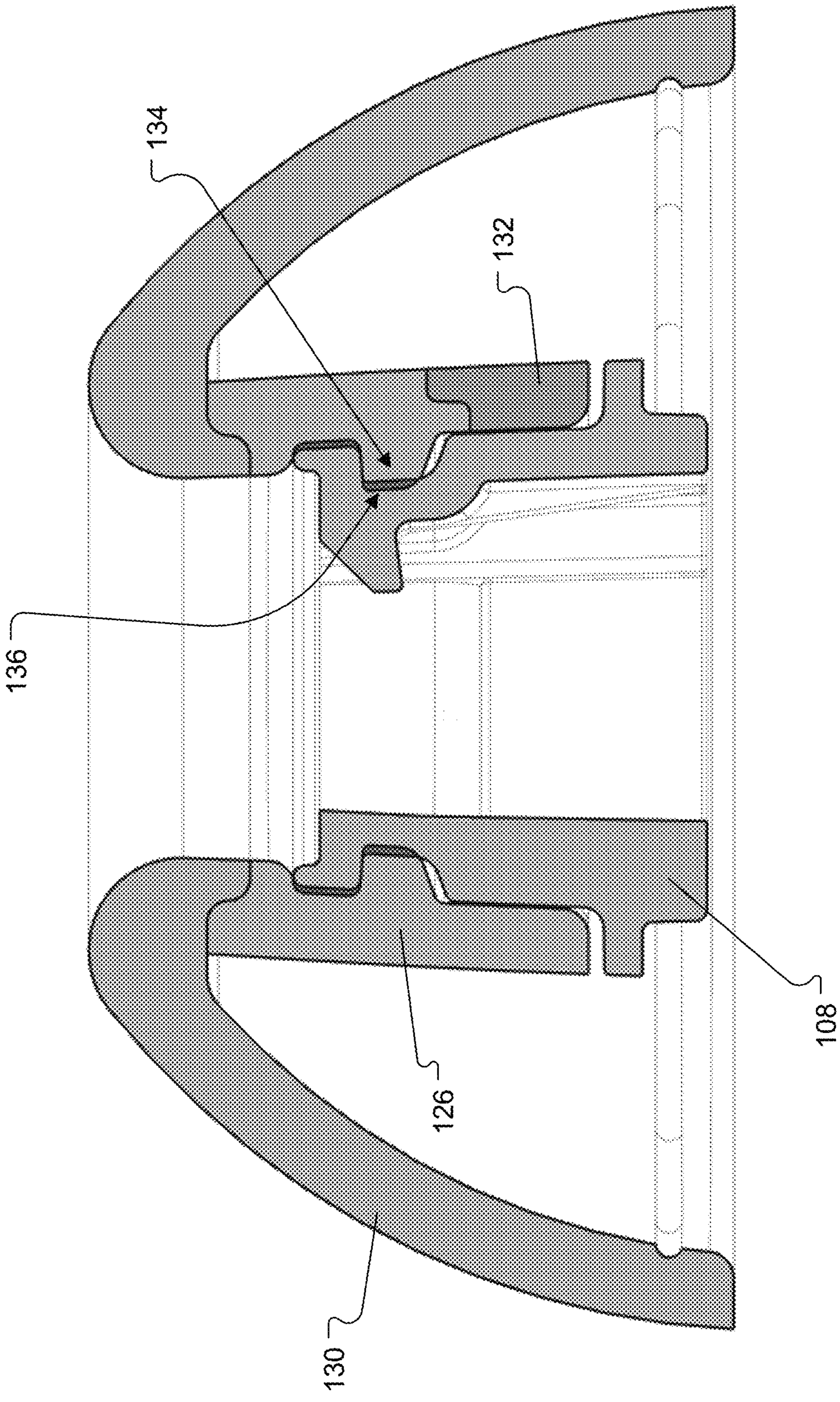
FIG. 4 is a cross-sectional side view of the ear tip of FIG. 3A shown mounted on a nozzle of an earbud.

With reference to FIGS. 3A through 3D, the ear tip 104 is configured to fit at least partially within a person's ear canal. The ear tip 104 includes a body 120 that is configured to be mounted onto the earbud 102. The body 120 includes a first end 122 and a second end 124 opposite the first end 122. The body 120 further includes inner wall 126 extending between the first end 122 the second end 124. The inner wall 126 defines and surrounds a hollow passage 128 which can be configured to conduct sound waves. The inner wall 126 has an oblong cross-sectional shape, e.g., the shape of an ellipse, an oval, a racetrack (having parallel sides and rounded ends that extend between the parallel sides, a/k/a "stadium"), or an oblong shape with rounded ends and curved splines connecting them as shown in FIG. 3B. Here, "cross-section" or "cross-sectional" should be understood to be normal to the central axis of the inner wall 126. The body 120 also includes an outer wall 130 connected to the inner wall 126 at the first end 122. The outer wall 130 extends away from the inner wall 126 toward the second end 124. In the illustrated example, the outer wall 130 is dome-like in shape; however other shapes, such as a cone, are contemplated. As shown in FIG. 3C, the outer wall 130 extends beyond the second end 124. In alternative implementations, the outer wall 130 may extend toward, but not necessarily reach the second end 124.

The implementation illustrated in FIGS. 3A-3C makes use of three different materials of differing hardness to form the ear tip 104, which is formed in a three-shot molding process. A first material, a hard plastic (e.g., glass-filled polyimide), is used to provide a ring 132 that engages the nozzle 108 for anti-rotation. In that regard, the ring 132 conforms to the oblong shape of the nozzle 108, which inhibits improper mounting of the ear tip 104 and inhibits rotation of the ear tip 104 relative to the nozzle 108 once it is mounted on the nozzle 108. As shown in FIG. 3B, the ring 132 can be C-shaped with a gap 133 that allows for some compliance that enables the ring 132 to accommodate the nozzle 108.

The second material is a high durometer compliant material such as a high durometer silicone, e.g., 60 Shore A to 80 Shore A silicone, e.g., 70 shore A silicone, that is molded around the ring 132. The ring 132 and the second material together form the inner wall 126. The second material defines a retention feature 134, e.g., a protrusion, that extends around an inner surface of the inner wall 126 and is configured to engage a complimentary retention feature 136, e.g., a recess, that is defined by and extends around an outer surface of the nozzle 108. The engagement of the retention features 134, 136 helps to retain the ear tip 104 on the nozzle 108 and provides a good acoustic seal between the earbud 102 and the ear tip 104.

The second material also fills the gap 133 in the ring 132, which allows for some compliance to fit over the nozzle 108, allowing the ends of the ring 132 to be displaced relative to each other, while providing a closed shaped (a closed ring) at the second end 124 of the ear tip 104.

The second material further defines at least a part of an extension 138 that extends between the nozzle 108 and the first end 122 of the ear tip 104. The use of the high durometer material in this region provides improved passive attenuation performance over prior art ear tips that used low durometer silicone in this region—low durometer silicone allows too much noise pass through.

Finally, the outer wall 130 is molded around the high durometer material. The outer wall 130 is formed of a lower durometer material, e.g., a low durometer silicone, e.g., 10 Shore A to 30 Shore A silicone, e.g., 20 Shore A silicone, for comfort. The outer wall 130 is the portion of the ear tip that contacts and conforms to the user's ear canal to form an acoustic seal therebetween. As shown in FIG. 3A, the outer wall 130 is in the shape of a dome that has an oblong cross-sectional shape, e.g., the shape of an ellipse, an oval, a racetrack (having parallel sides and rounded ends that extend between the parallel sides, a/k/a "stadium"), or an oblong shape with rounded ends and curved splines connecting them as shown in FIG. 3A. Here, "cross-section" or "cross-sectional" should be understood to be normal to the central axis of the dome/outer wall 130.

The ear tip 104 can be formed in a three-shot molding process in which the ring 132 is formed in a first molding step, followed by the remainder of the inner wall 126 in a second molding step, and, finally, the outer wall 130 is formed in a third molding step.

Figure 5:
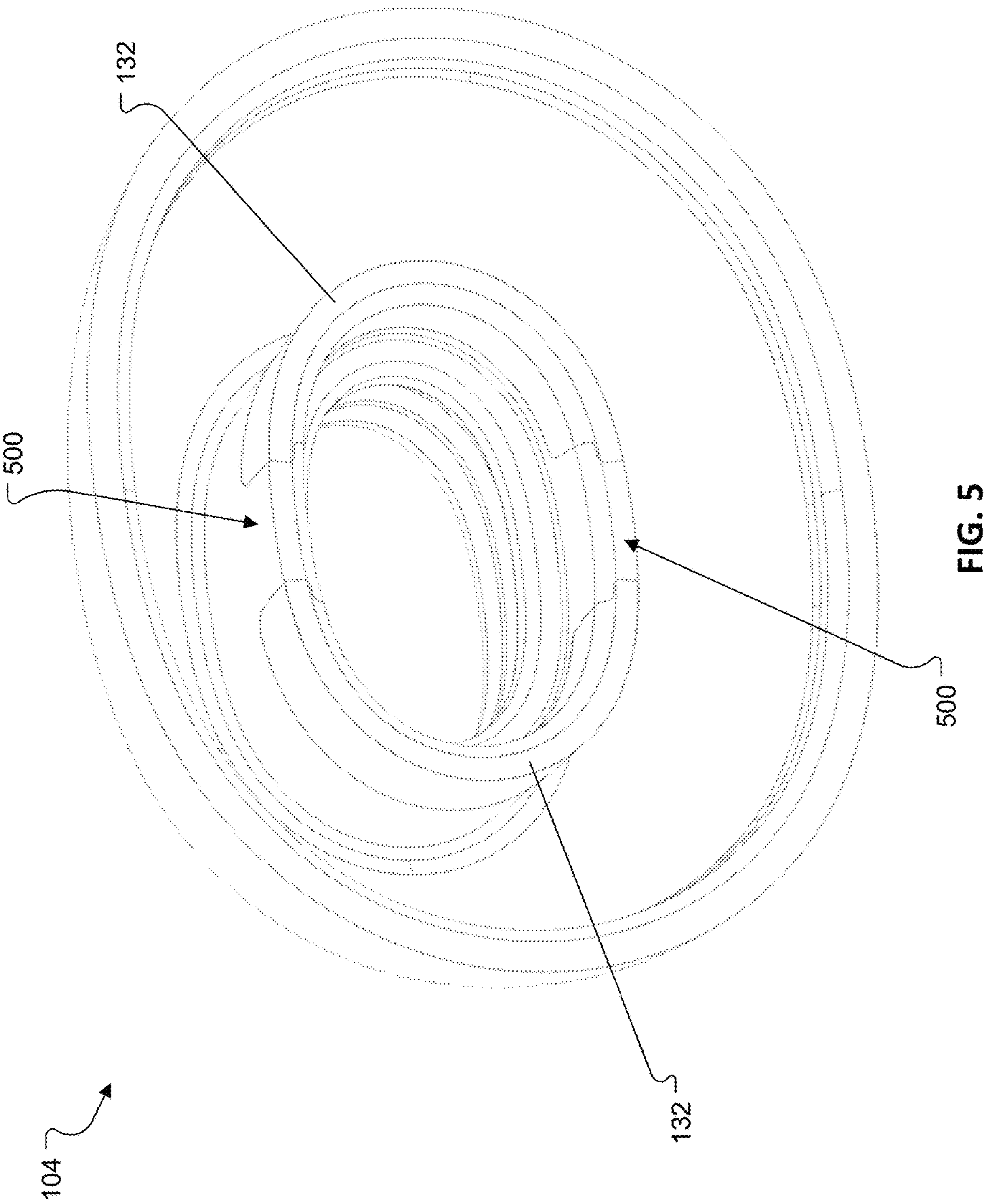
FIG. 5 is a rear perspective view of a second implementation of an ear tip according to the present disclosure.

FIG. 5 illustrates an alternative implementation in which the ring 132 is formed of 2 discrete C-shaped members, both formed of the rigid plastic material (e.g., glass-filled polyimide) with a pair of gaps 500 between those sections. The gaps 500 are filled with the second material during the molding process.

Figure 6A:
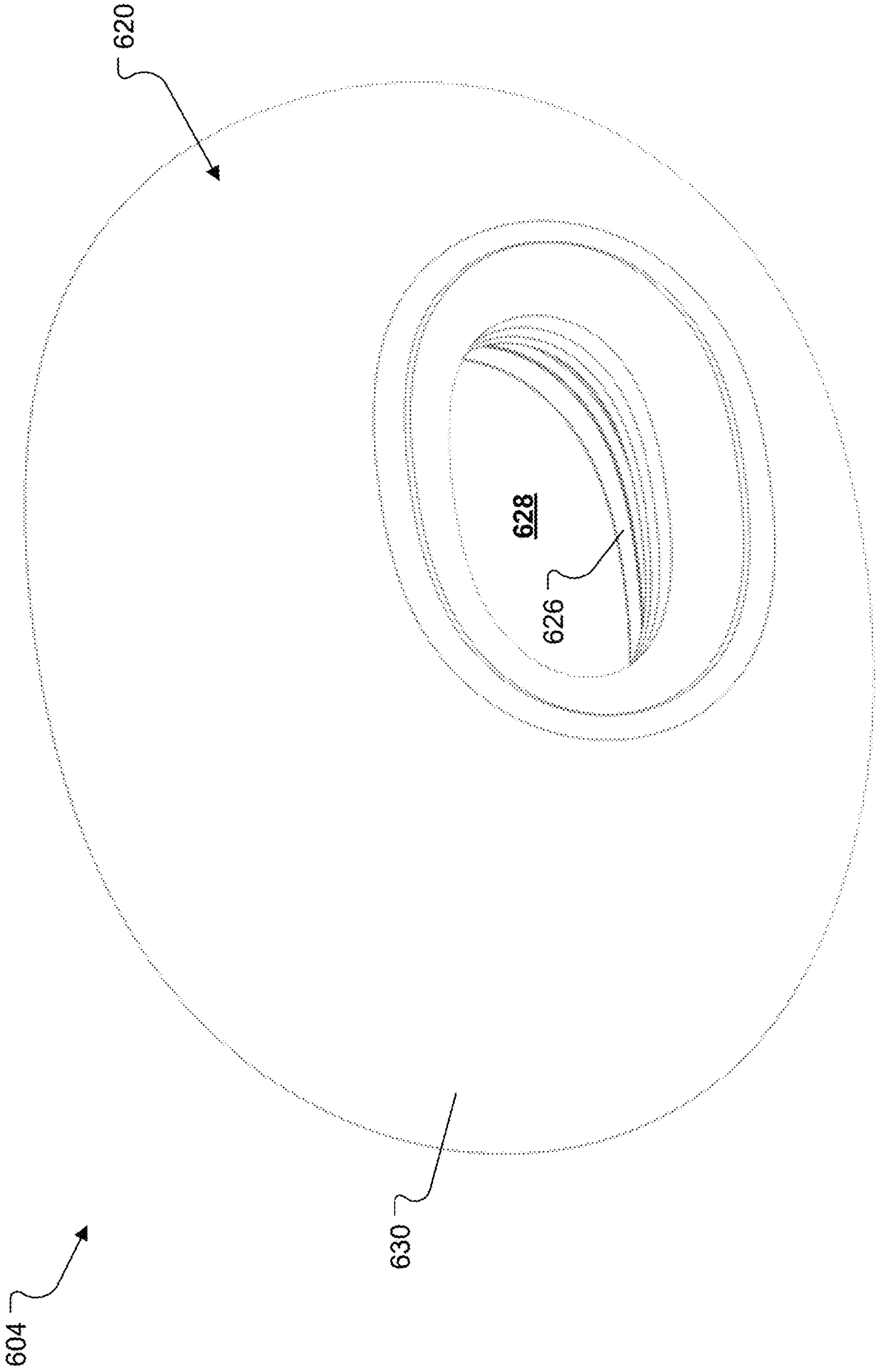
FIG. 6A is a front perspective view of a third implementation of an ear tip according to the present disclosure.
Figure 6B:
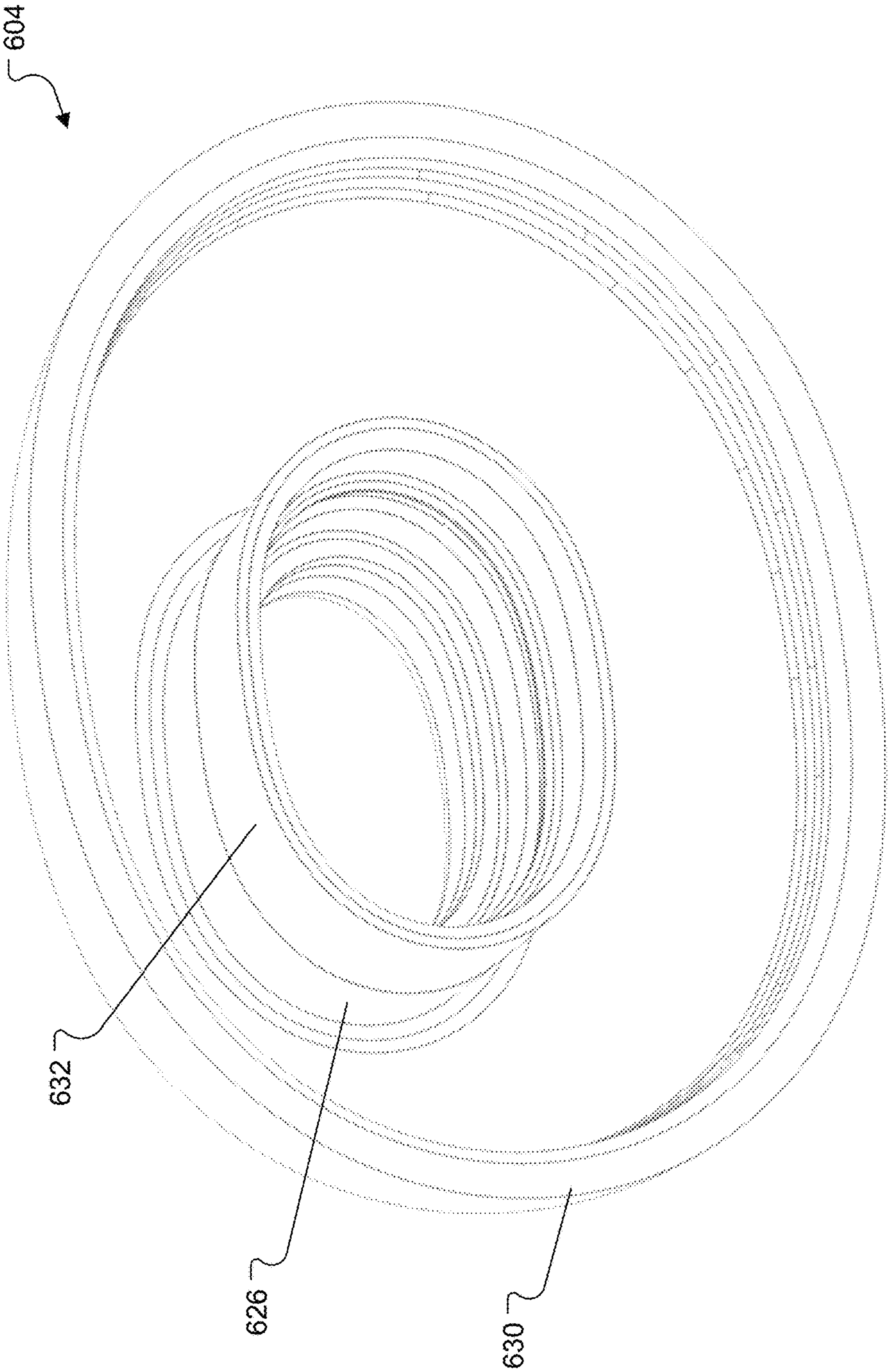
FIG. 6B is a rear perspective view of the ear tip of FIG. 6A.
Figure 6C:
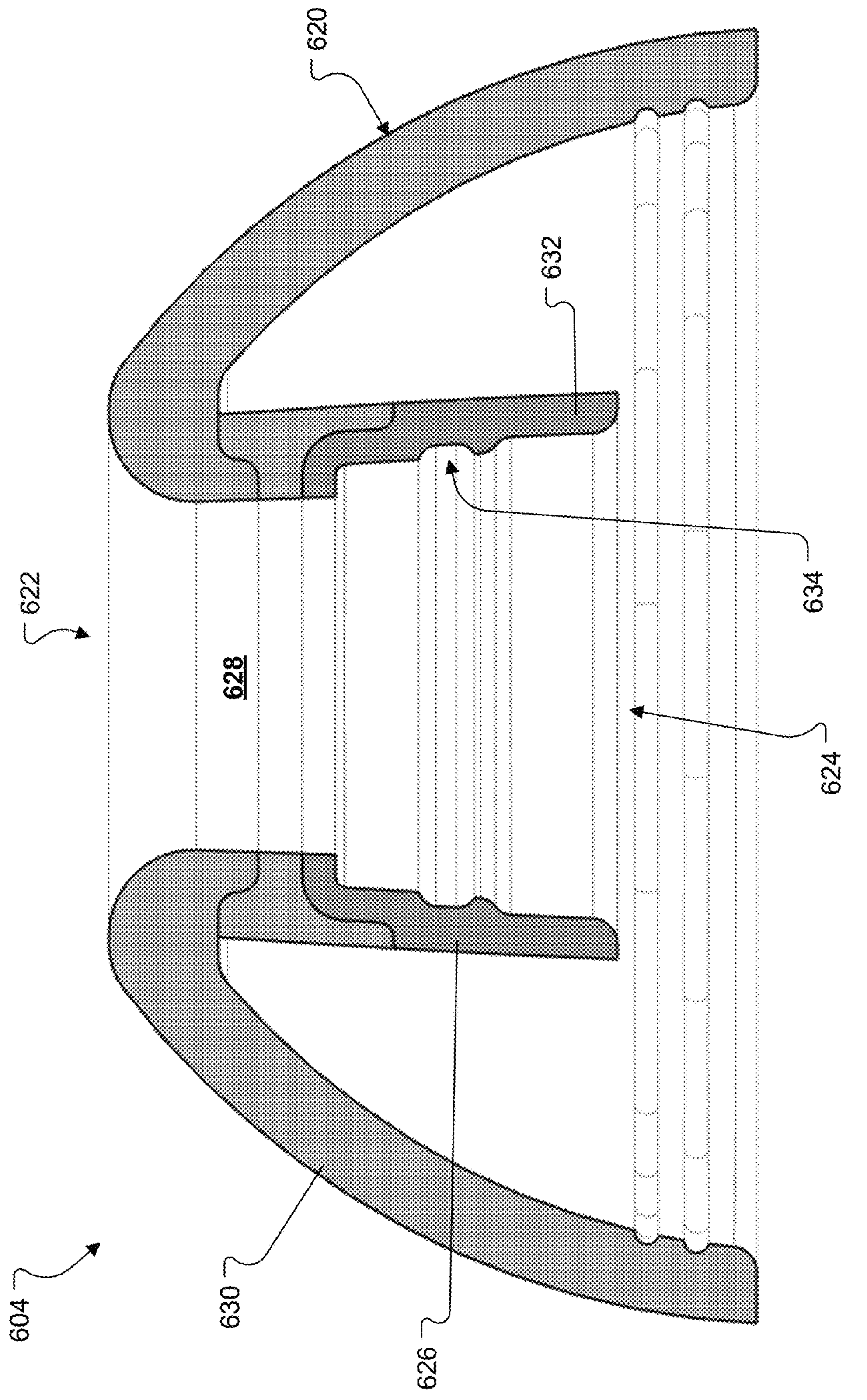
FIG. 6C is a cross-sectional side view of the ear tip of FIG. 6A.

FIGS. 6A through 6D illustrate another implementation of an ear tip 604 that includes a body 620 that is configured to be mounted onto an earbud (e.g., earbud 102, FIGS. 1A & 1B). The body 620 includes a first end 622 and a second end 624 opposite the first end 622. The body 620 further includes inner wall 626 extending between the first end 622 the second end 624. The inner wall 626 defines and surrounds a hollow passage 628 which can be configured to conduct sound waves. The inner wall 626 has an oblong cross-sectional shape, e.g., the shape of an ellipse, an oval, a racetrack (having parallel sides and rounded ends that extend between the parallel sides, a/k/a “stadium”), or an oblong shape with rounded ends and curved splines connecting them as shown in FIG. 6B. Here, “cross-section” or “cross-sectional” should be understood to be normal to the central axis of the inner wall 626. The body 620 also includes an outer wall 630 connected to the inner wall 626 at the first end 622. The outer wall 630 extends away from the inner wall 626 toward the second end 624. In the illustrated example, the outer wall 630 is dome-like in shape; however other shapes, such as a cone, are contemplated. As shown in FIG. 6C, the outer wall 630 extends beyond the second end 624. In alternative implementations, the outer wall 630 may extend toward, but not necessarily reach the second end 624.

The implementation illustrated in FIG. 6A through 6D again makes use of three different materials of differing hardness to form the ear tip 604, which is formed in a three-shot molding process. A first material, a hard plastic (e.g., glass-filled polyimide), is used to provide a ring 632 that engages the nozzle 108 for anti-rotation. In that regard, the ring 632 conforms to the oblong shape of the nozzle 108, which inhibits improper mounting of the ear tip 604 once it is mounted on the nozzle 108.

Figure 6D:
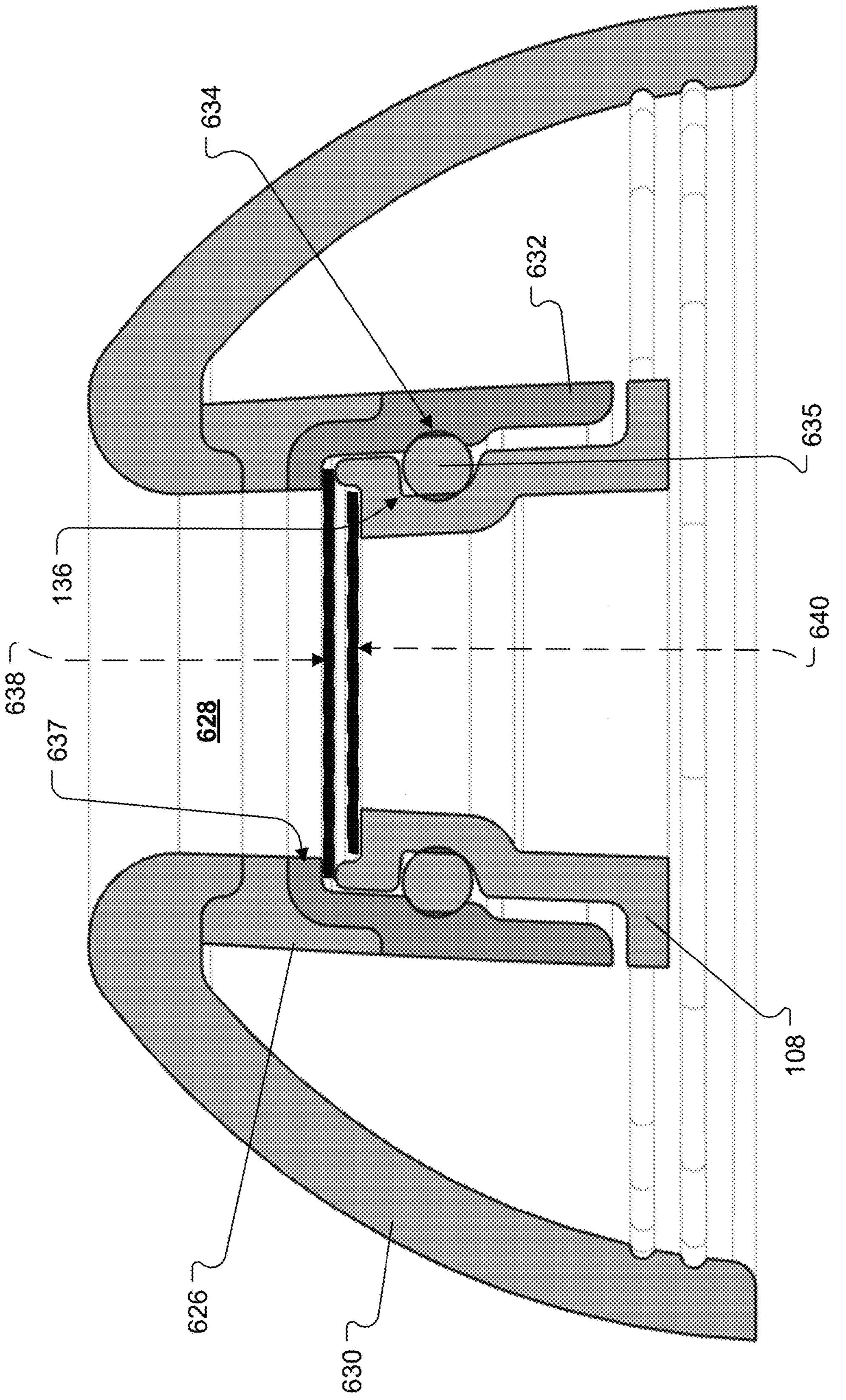
FIG. 6D is a cross-sectional side view of the ear tip of FIG. 6A shown mounted on a nozzle of an earbud.

As shown in FIGS. 6C and 6D, the ring 632 defines a recess 634, e.g., an annular groove, that extends around an inner surface of the inner wall 626 and is configured to receive an O-ring 635 (e.g., a rubber O-ring) that is seated within a corresponding recess 136, e.g., an annular groove, that is formed in and extends around an outer surface of the nozzle 108. In this implementation, the engagement of the retention features 634, 136 with the O-ring 635 helps to retain the ear tip 604 on the nozzle 108 and also provides a good acoustic seal between the earbud 102 and the ear tip 604.

As shown in FIGS. 6C and 6D, the ring 632 may also define a lip 637 that overlaps the end of the nozzle 108. The lip 637 can support a wax guard 638—e.g., a screen that may be heat staked to the lip 637. This can be an alternative to, or in addition to, a wax guard 640 (FIG. 6D) on the nozzle 108 itself.

The second material is a high durometer compliant material such as a high durometer silicone, e.g., 60 Shore A to 80 Shore A silicone, e.g., 70 Shore A silicone, that is molded around the ring 632. The ring 632 and the second material together form the inner wall 626. The second material defines at least a part of an extension 642 that extends between the nozzle 108 and the first end 622 of the ear tip 604. The use of the high durometer material in this region provides improved passive attenuation performance over prior art ear tips that used low durometer silicone in this region—low durometer silicone allows too much noise pass through.

Finally, the outer wall 630 is molded around the high durometer material. The outer wall 630 is formed of a lower durometer compliant material such as a low durometer silicone, e.g., 10 Shore A to 30 Shore A silicone, e.g., 20 shore A silicone, for comfort. The outer wall 630 is the portion of the ear tip that contacts and conforms to the user’s ear canal to form an acoustic seal therebetween. As shown in FIG. 6A, the outer wall 130 is in the shape of a dome that has an oblong cross-sectional shape, e.g., the shape of an ellipse, an oval, a racetrack (having parallel sides and rounded ends that extend between the parallel sides, a/k/a “stadium”), or an oblong shape with rounded ends and curved splines connecting them as shown in FIG. 6A. Here, “cross-section” or “cross-sectional” should be understood to be normal to the central axis of the dome/outer wall 630.

Figure 7A:
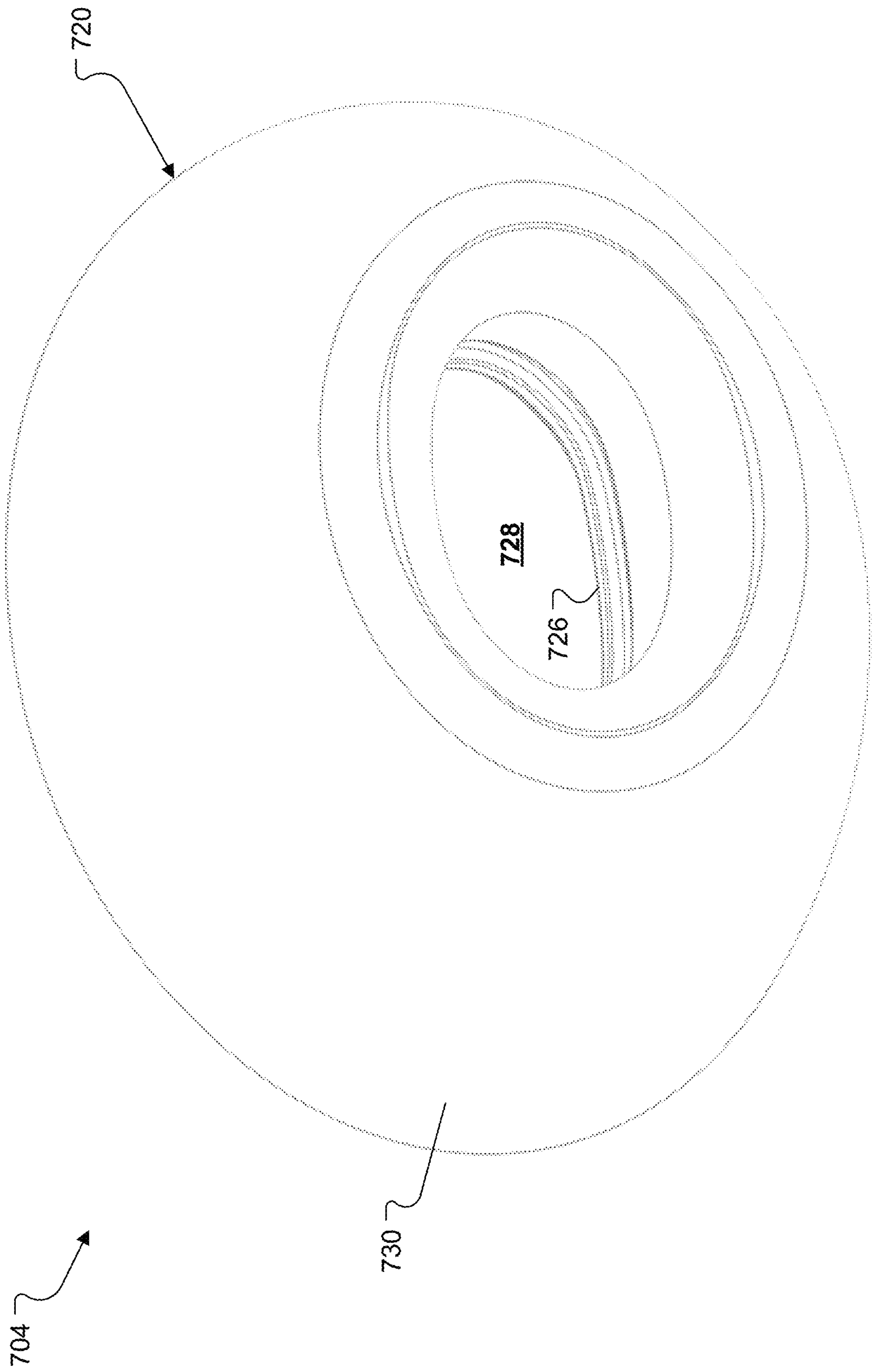
FIG. 7A is a front perspective view of a fourth implementation of an ear tip according to the present disclosure.
Figure 7B:
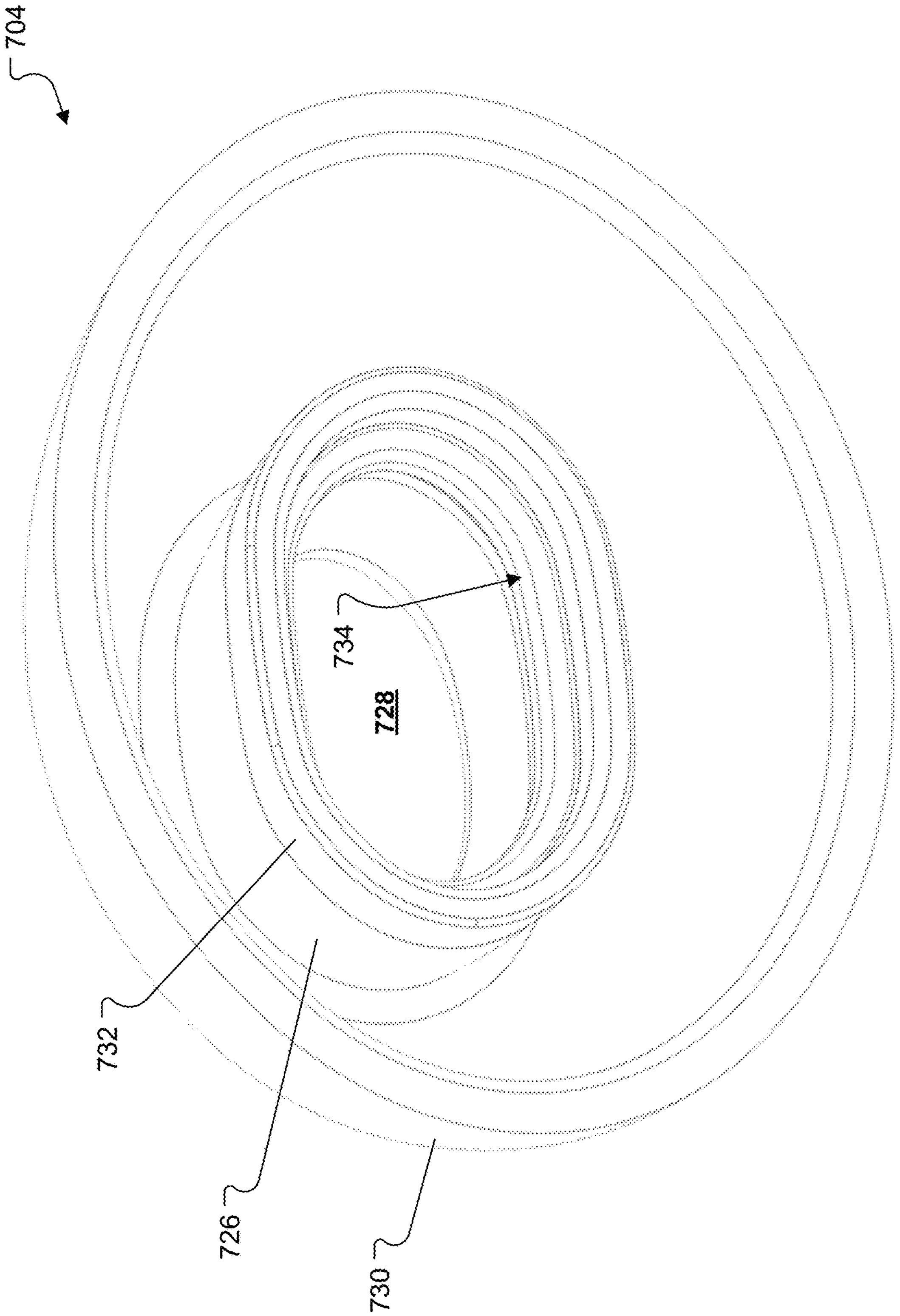
FIG. 7B is a rear perspective view of the ear tip of FIG. 7A.

FIGS. 7A-7D illustrate yet another implementation of an ear tip 704 that includes a body 720 that is configured to be mounted onto an earbud (e.g., earbud 102, FIGS. 1A & 1B). The body 720 includes a first end 722 and a second end 724 opposite the first end 722. The body 720 further includes inner wall 726 extending between the first end 722 the second end 724. The inner wall 726 defines and surrounds a hollow passage 728 which can be configured to conduct sound waves. The inner wall 726 has an oblong cross-sectional shape, e.g., the shape of an ellipse, an oval, a racetrack (having parallel sides and rounded ends that extend between the parallel sides, a/k/a “stadium”), or an oblong shape with rounded ends and curved splines connecting them as shown in FIG. 7B. Here, “cross-section” or “cross-sectional” should be understood to be normal to the central axis of the inner wall 726. The body 720 also includes an outer wall 730 connected to the inner wall 726 at the first end 722. The outer wall 730 extends away from the inner wall 726 toward the second end 724. In the illustrated example, the outer wall 730 is dome-like in shape; however other shapes, such as a cone, are contemplated.

The implementation illustrated in FIG. 7A through 7D makes use of a viscoelastic material with frequency stiffening behavior, such as a styrenic thermoplastic elastomer (TPE) with viscoelastic attributes, e.g., A9 TPE. A suitable A9 thermoplastic elastomer is available under the tradename GLS™, product number LC AB5-741, available from Avient (formerly PolyOne) of McHenry, Illinois The viscoelastic material forms the outer wall 730 and at least a portion of the inner wall 726 including at least a part of an extension 742 that extends between the nozzle 108 and the first end 722 of the ear tip 704. The use of a material with frequency stiffening behavior in this extension region provides improved passive attenuation performance in the 1 kHz to 1.5 kHz frequency band over prior art ear tips that used low durometer silicone in this region—low durometer silicone allows too much noise pass through. Because the material is viscoelastic it has a damping characteristic. It helps to attenuate impact and shock and vibration which also helps with stability. Other suitable viscoelastic materials are described and claimed in U.S. Pat. No. 10,623,846, titled “Earpieces Employing Viscoelastic Materials,” the complete disclosure of which is incorporated herein by reference.

For example, in some cases, the viscoelastic material may consist of a composition including one or more elastomers, wherein the composition has a low frequency modulus metric (Mlf) of about 0.5 to about 1, a high frequency modulus metric (Mhf) of about 0.5 to about 1, and a glass transition temperature (Tg) of about −25° C. to about 30° C. At least one of the one or more elastomers may be polynorbornene, polyurethane, styrenic-based thermoplastic elastomer, butyl rubber, acrylic, thermoplastic vulcanizates, nitrile rubber, etc. At least one of the one or more elastomers may be polynorbornene. The polynorbornene may have a density of about 0.8 to about 1.2 kg/dm3, a hardness of about 10 to about 20 Shore A, and a tensile strength of about 2 to about 8 MPa. The composition may include polynorbornene, antioxidant, UV stabilizer, curatives, inhibitors, plasticizers, fillers, etc. The Tg may be about 5° C. to about 30° C. The Tg may be about 20° C. to about 30° C. The Tg may be about 5° C. to about 25° C. The Mhf may be about 0.7 to about 1. The Mlf may be about 0.7 to about 1. The product of Mhf and Mlf may be about 0.5 to about 1.

The viscoelastic material, particularly the TPE, can be vulnerable to sebum. In that regard, an outer surface of the ear tip 704, e.g., at least an outer surface of the outer wall 730, can be processed with a surface treatment, such as E-beam processing or photoionization to form a cross-linked matrix within an outer layer of the ear tip 704 such that the outer layer has less affinity to sebum than an inner layer (or untreated area(s)) of the ear tip 704. Additional details regarding the surface treatment are described and claims in U.S. Pat. No. 10,856,069, titled "Sebum Resistance Enhancement for Wearable Devices," the complete disclosure of which is incorporated herein by reference.

What E-beam processing does to TPE is it is a curing step. Once the TPE is molded to its desired shape, the E-beam processing creates a chemical cross-linking in the material that converts it to a silicone like state that provides great sebum resistance and chemical resistance. It helps with sebum resistance and unlocks the ability to add a soft touch top coat on it. The E-beam processing can also provide for improved performance in a number of tests including thermal shock.

In some implementations, the ear tip 704, at least the outer wall 730, may be treated with a soft touch coating such as those described and claimed in U.S. application Ser. No. 17/232,479, titled "Soft Touch Material," and filed Apr. 16, 2021, the complete disclosure of which is incorporated herein by reference. For example, a TPE forming the outer wall 730 may be treated with a 50% poly(styrene-isobutylene-styrene) (SIBS) block copolymer/50% silicone (wt/wt) soft touch coating.

As alluded to above, the E-beam processing can enable the application of the soft touch top coat without damaging the part. The top coat can be applied via a spray and is then cured. In the process of applying the top coat, the part (the ear tip 704) is stressed with solvents. After that it is cured at a high temperature. All of this can stress the parts. The E-beam processing cross-links the part and increases its resistance to solvents and temperature.

The soft touch coating can be applied anywhere the user would touch. The soft touch top coat provides a premium finish and helps with seal and initial comfort. The soft touch top coat can also help with dust prevention—the A9 TPE material has a tendency to collect a lot of dust.

The viscoelastic material may also include a cooling and sensation inducing material, such as described and claimed in U.S. Pat. No. 10,531,174, titled "Earpiece Employing Cooling and Sensation Inducing Materials," the complete disclosure of which is incorporated herein by reference. For example, the viscoelastic material may include a composition including an elastomer, e.g., a styrenic TPE with viscoelastic attributes, such as A9 TPE, and one or more phase change materials having a phase change ability from solid to liquid state at a predetermined phase-change temperature, e.g., about 25° C. to about 35° C. The composition may have a hardness of about 5 Shore A to about 50 Shore A, and the amount of the phase change material in the composition is about 10% to about 40% by weight.

In the implementation illustrated in FIGS. 7A-7D, the viscoelastic material defines a retention feature 734, e.g., a protrusion, that extends around an inner surface of the inner wall 726 and is configured to engage a complimentary retention feature 136, e.g., a recess, that is defined by and extends around an outer surface of the nozzle 108. The engagement of the retention features 734, 136 helps to retain the ear tip 704 on the nozzle 108 and also provides a good acoustic seal between the earbud 102 and the ear tip 704.

Figure 7C:
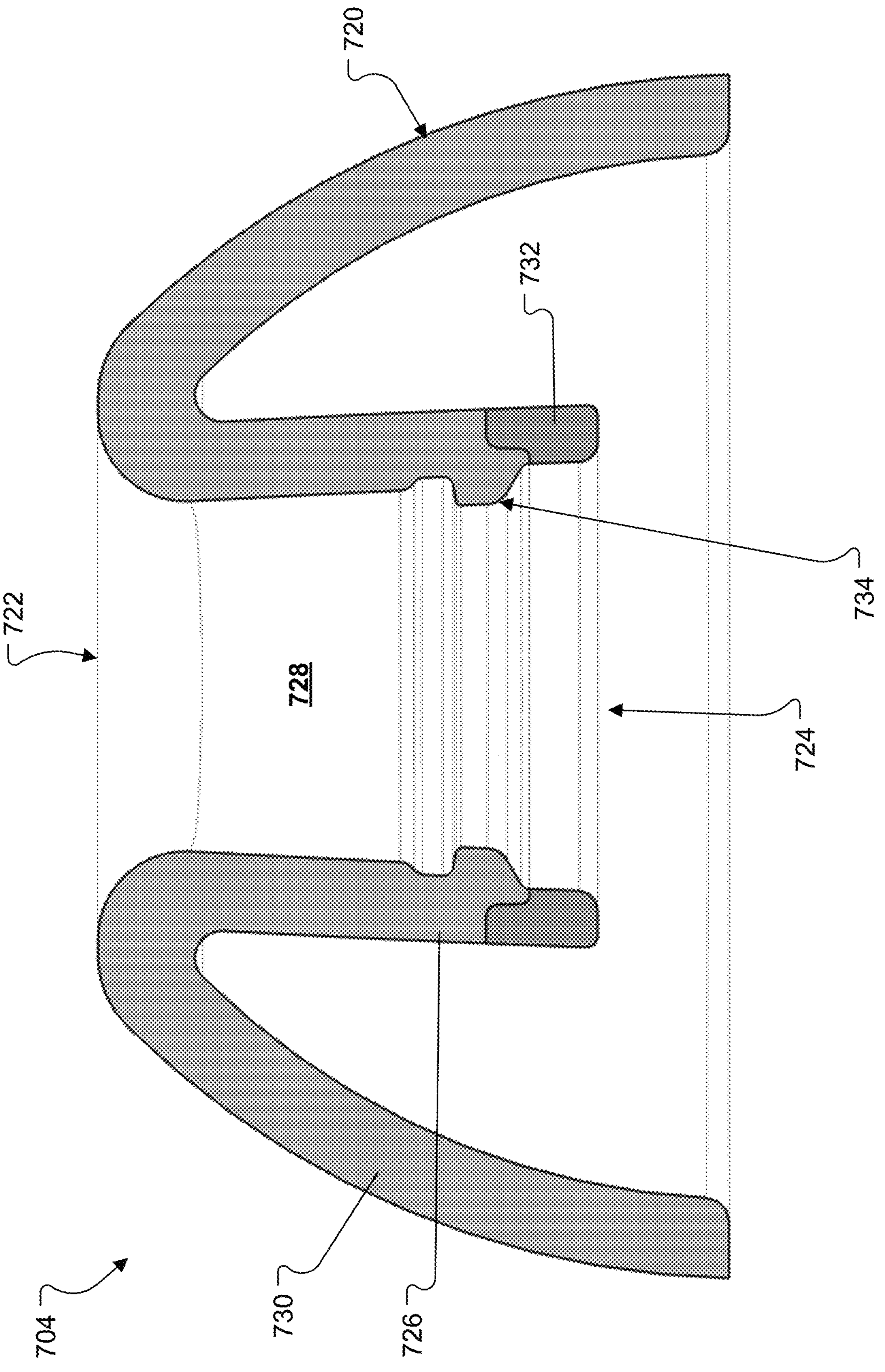
FIG. 7C is a cross-sectional side view of the ear tip of FIG. 7A.
Figure 7D:
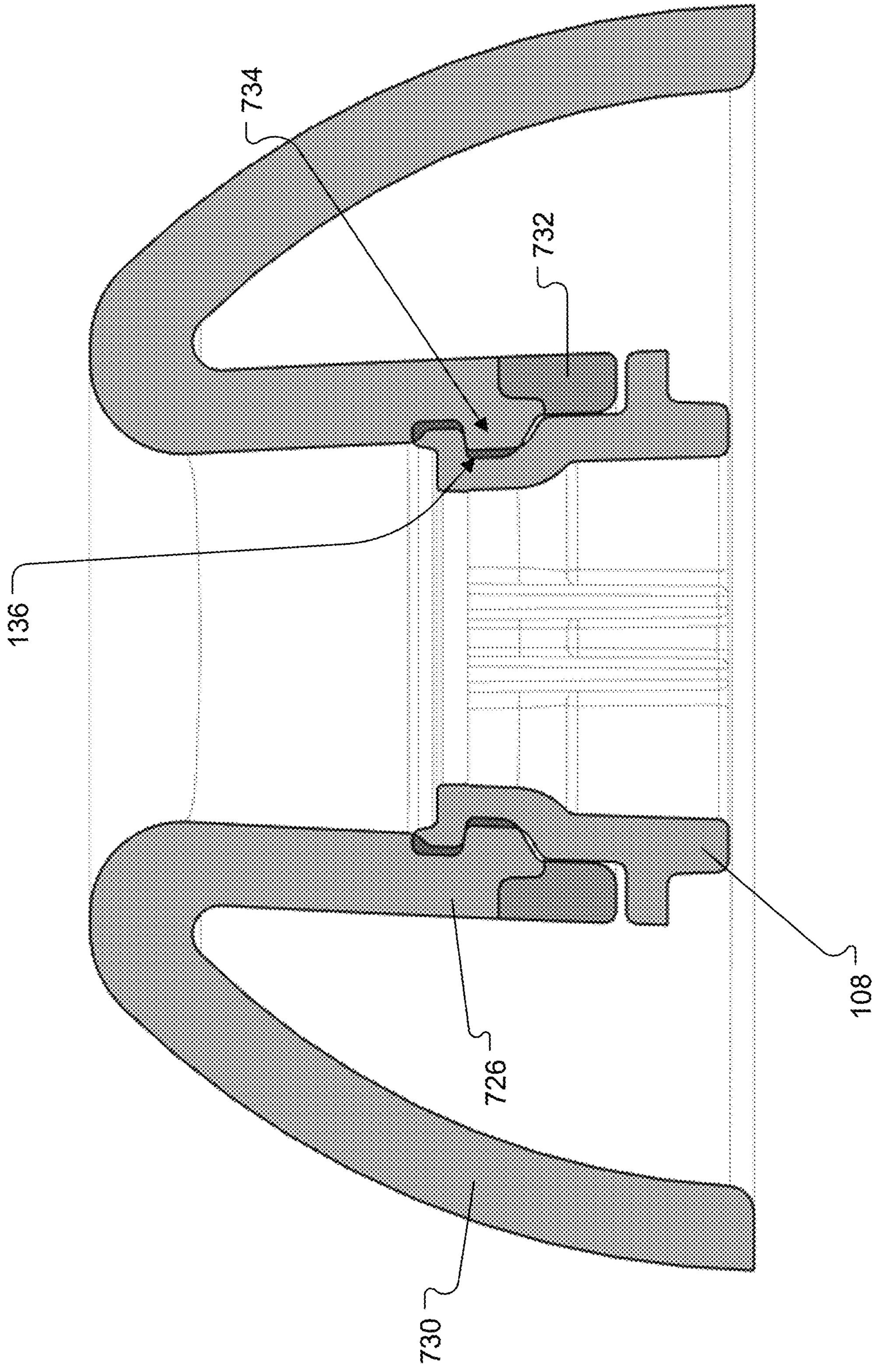
FIG. 7D is a cross-sectional side view of the ear tip of FIG. 7A shown mounted on a nozzle of an earbud.

As shown in FIGS. 7B through 7D, the inner wall 726 a ring 132 that is formed of a rigid plastic material, such as glass-filled polyimide. The ring 726 is configured to engage the nozzle 108 for anti-rotation. In that regard, the ring 732 conforms to the oblong shape of the nozzle 108, which inhibits improper mounting of the ear tip 104 once it is mounted on the nozzle 108; i.e., the ring 732 ensures that the tip only fits on the nozzle 108 when it is properly oriented relative thereto and the oblong cross-sectional shape of the ring 732 and the nozzle 108, together with the rigidity of the ring 732, helps to ensure that the ear tip 704 cannot rotate about the nozzle 108 once it is mounted. As shown in FIG. 7B, the ring 732 can be a closed form (e.g., a closed loop) that is oblong, e.g., racetrack, in shape. Alternatively, the ring 732 can be an open form, such as C-shaped, with a gap that allows for some compliance that enables the ring 732 to accommodate the nozzle 108. The gap can be filled with the viscoelastic material during the molding process during which the ear tip 704 is formed. In some cases, the ring 732 can be formed of two discrete C-shape members, such as shown in FIG. 5. In the implementation of FIGS. 7A-7D, the ring 732 and the viscoelastic material together form the inner wall 726.

The ear tip 704 can be formed in a two-shot molding process in which the ring 732 is formed first, in a first molding step, and then the remainder of the ear tip 704 (i.e., the rest of the inner wall 726 and the outer wall 730) is formed in a second molding step.

Figure 8A:
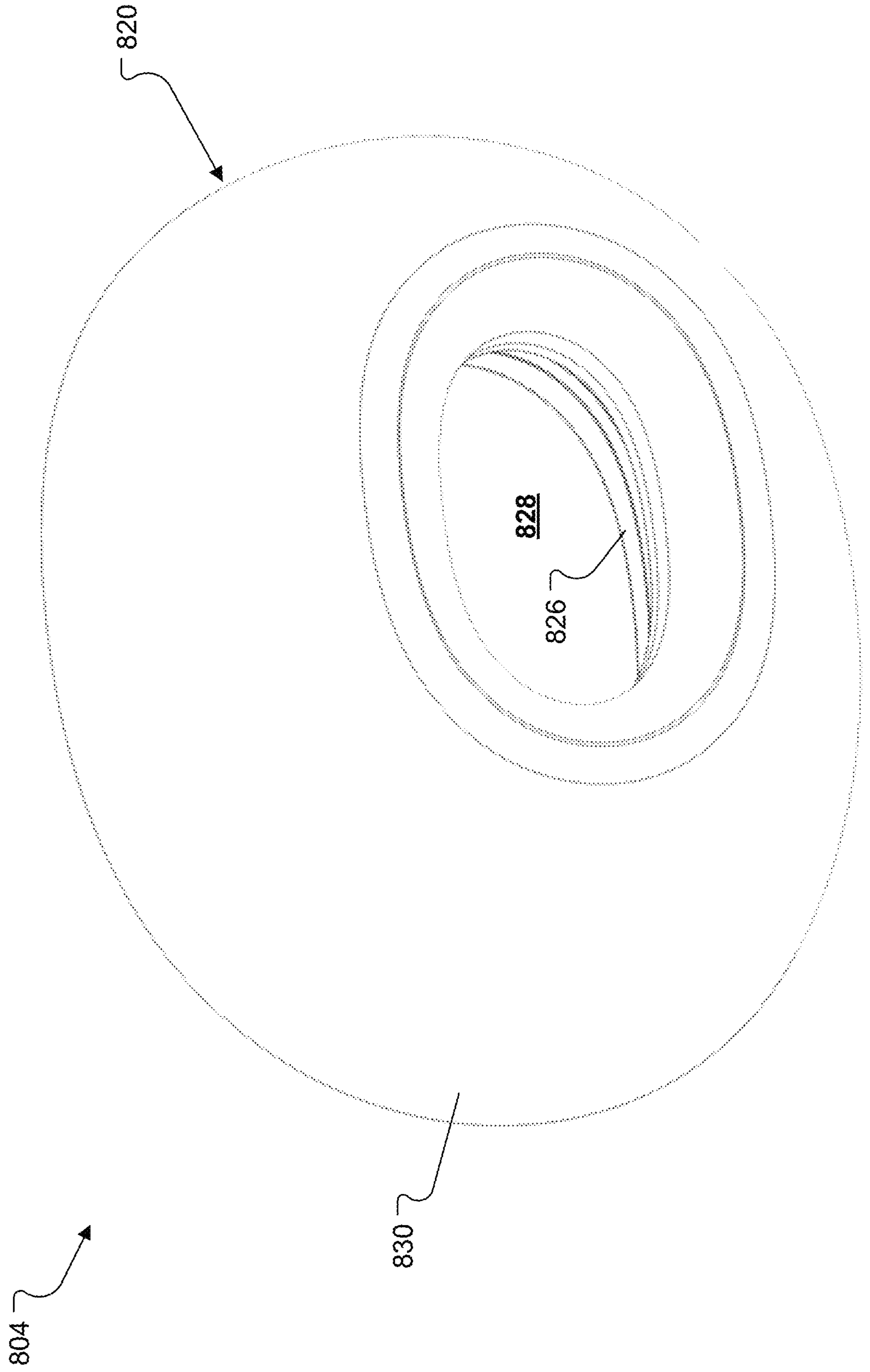
FIG. 8A is a front perspective view of a fifth implementation of an ear tip according to the present disclosure.
Figure 8B:
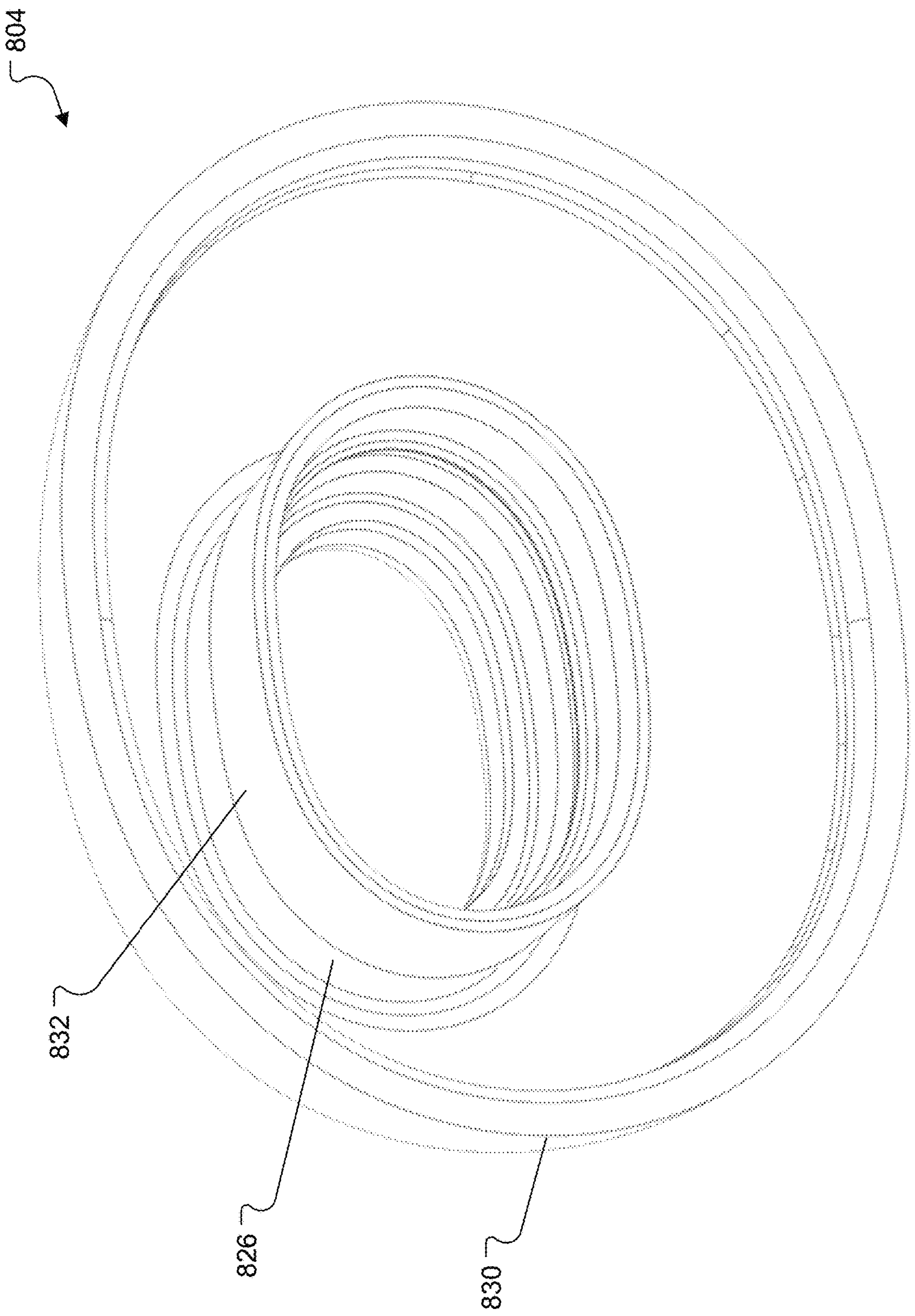
FIG. 8B is a rear perspective view of the ear tip of FIG. 8A.
Figure 8C:
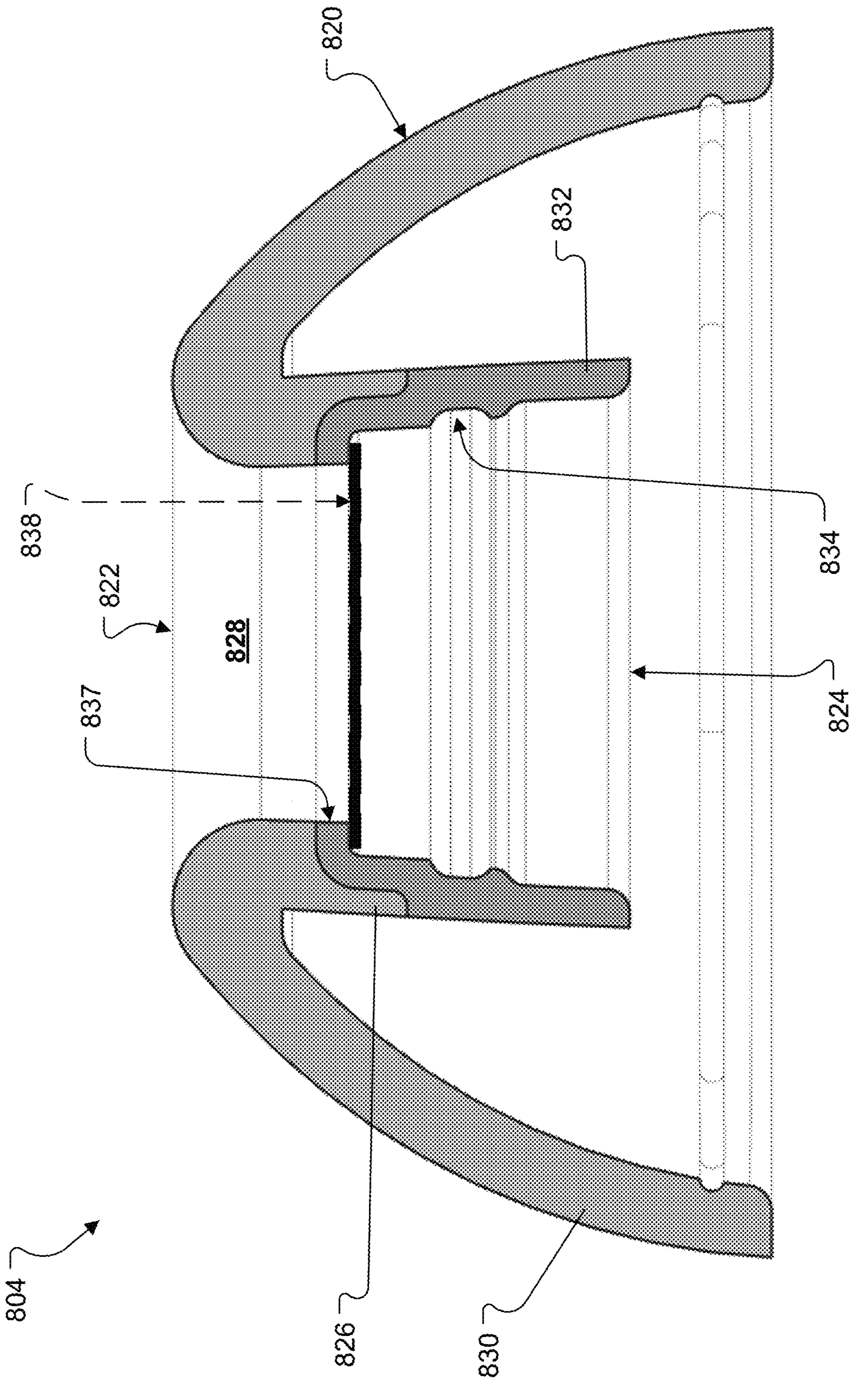
FIG. 8C is a cross-sectional side view of the ear tip of FIG. 8A.

FIGS. 8A through 8D illustrate another implementation of an ear tip 804 that includes a body 820 that is configured to be mounted onto an earbud (e.g., earbud 102, FIGS. 1A & 1B). The body 820 includes a first end 822 and a second end 824 opposite the first end 822. The body 820 further includes inner wall 826 extending between the first end 822 the second end 824. The inner wall 826 defines and surrounds a hollow passage 828 which can be configured to conduct sound waves. The inner wall 826 has an oblong cross-sectional shape, e.g., the shape of an ellipse, an oval, a racetrack (having parallel sides and rounded ends that extend between the parallel sides, a/k/a "stadium"), or an oblong shape with rounded ends and curved splines connecting them as shown in FIG. 8B. Here, "cross-section" or "cross-sectional" should be understood to be normal to the central axis of the inner wall 826. The body 820 also includes an outer wall 830 connected to the inner wall 826 at the first end 822. The outer wall 830 extends away from the inner wall 826 toward the second end 824. In the illustrated example, the outer wall 830 is dome-like in shape; however other shapes, such as a cone, are contemplated. As shown in FIG. 8C, the outer wall 830 extends beyond the second end 824. In alternative implementations, the outer wall 830 may extend toward, but not necessarily reach the second end 824.

The implementation illustrated in FIG. 8A through 8D again makes use of a viscoelastic material with frequency stiffening behavior, such as a styrenic TPE with viscoelastic attributes, e.g., A9 TPE. The viscoelastic material may include any of the surface treatment or compounds discussed above with respect to FIGS. 7A-7D.

Figure 8D:
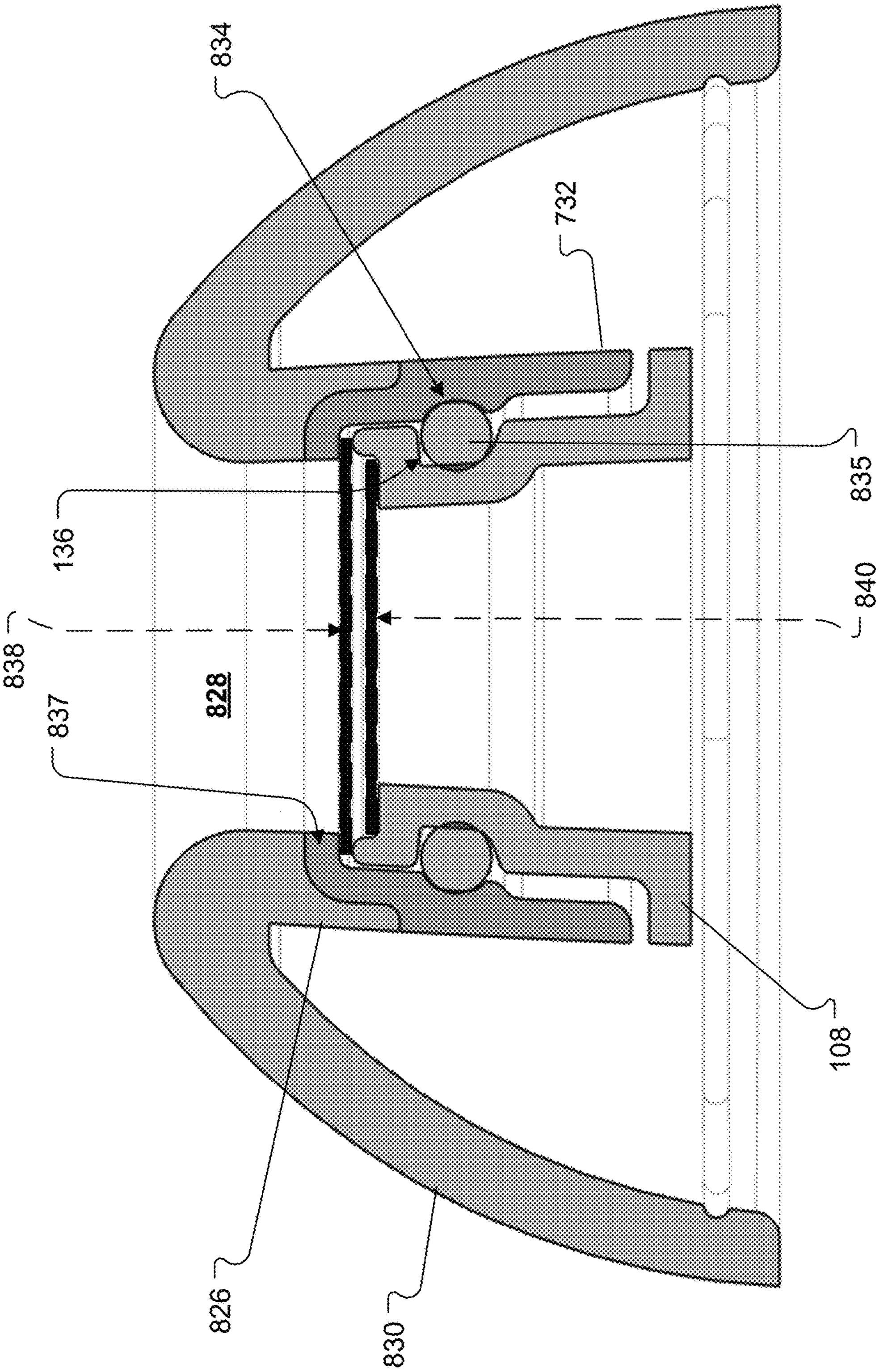
FIG. 8D is a cross-sectional side view of the ear tip of FIG. 8A shown mounted on a nozzle of an earbud.

As shown in FIGS. 8B-8D, the ear tip 804 may include a ring 832 that engages the nozzle 108 for anti-rotation. In that regard, the ring 832 conforms to the oblong shape of the nozzle 108, which inhibits improper mounting of the ear tip 804 once it is mounted on the nozzle 108. As in various implementations described above, the ring 832 may be formed of a rigid plastic, such as glass-filled polyimide.

As shown in FIGS. 8C and 8D, the ring 832 defines a recess 834, e.g., an annular groove, that extends around an inner surface of the inner wall 826 and is configured to receive an O-ring 835 (e.g., a rubber O-ring) that is seated within a corresponding recess 136, e.g., an annular groove, that is formed in and extends around an outer surface of the nozzle 108. In this implementation, the engagement of the retention features 834, 136 with the O-ring 835 helps to retain the ear tip 804 on the nozzle 108 and also provides a good acoustic seal between the earbud 102 and the ear tip 804.

As shown in FIGS. 8C and 8D, the ring 832 may also define a lip 837 that overlaps the end of the nozzle 108. The lip 837 can support a wax guard 838—e.g., a screen that may be heat staked to the lip 837. This can be an alternative to, or in addition to, a wax guard 840 (FIG. 8D) on the nozzle 108 itself.

Figure 9A:
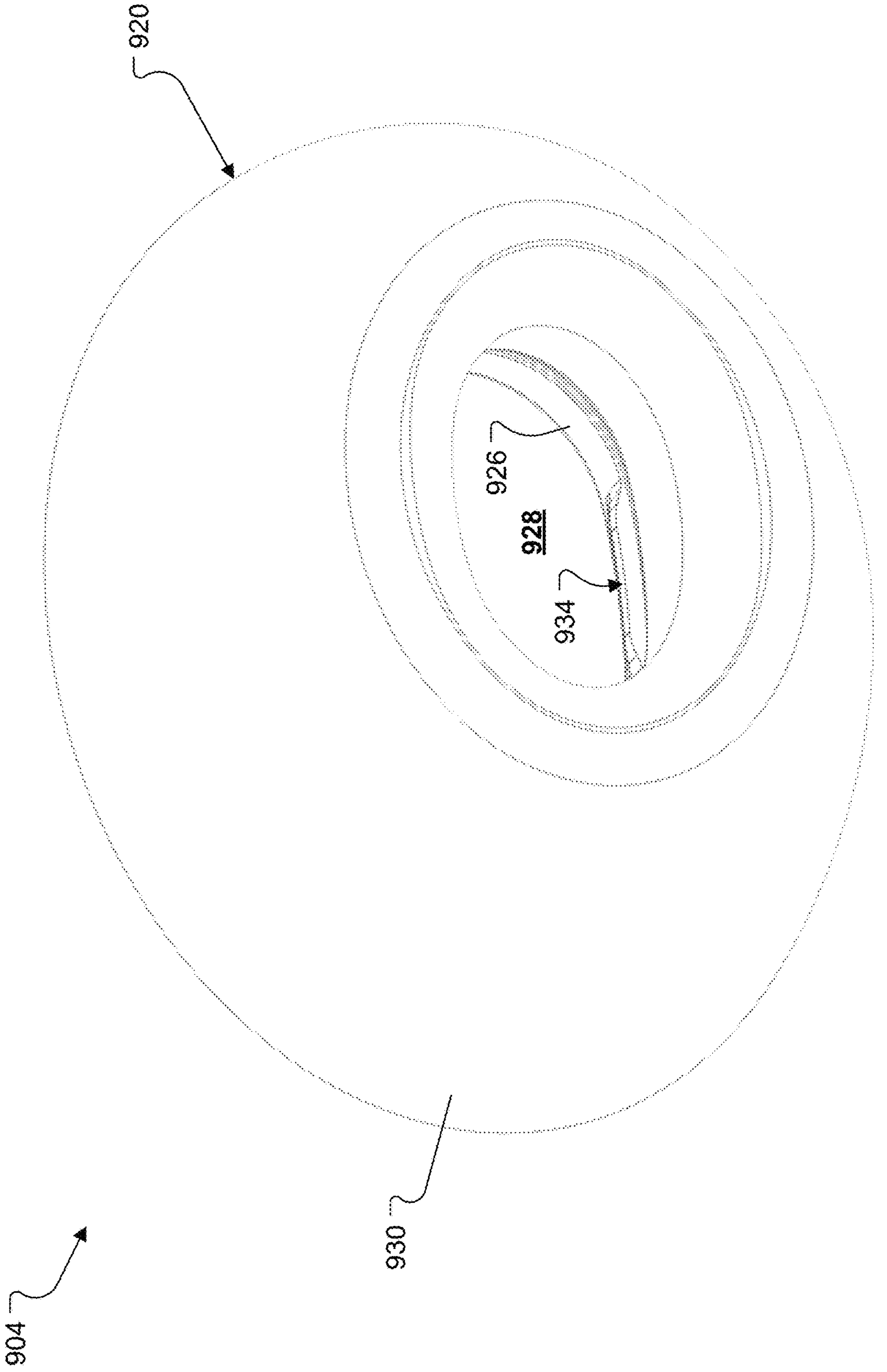
FIG. 9A is a front perspective view of a sixth implementation of an ear tip according to the present disclosure.
Figure 9B:
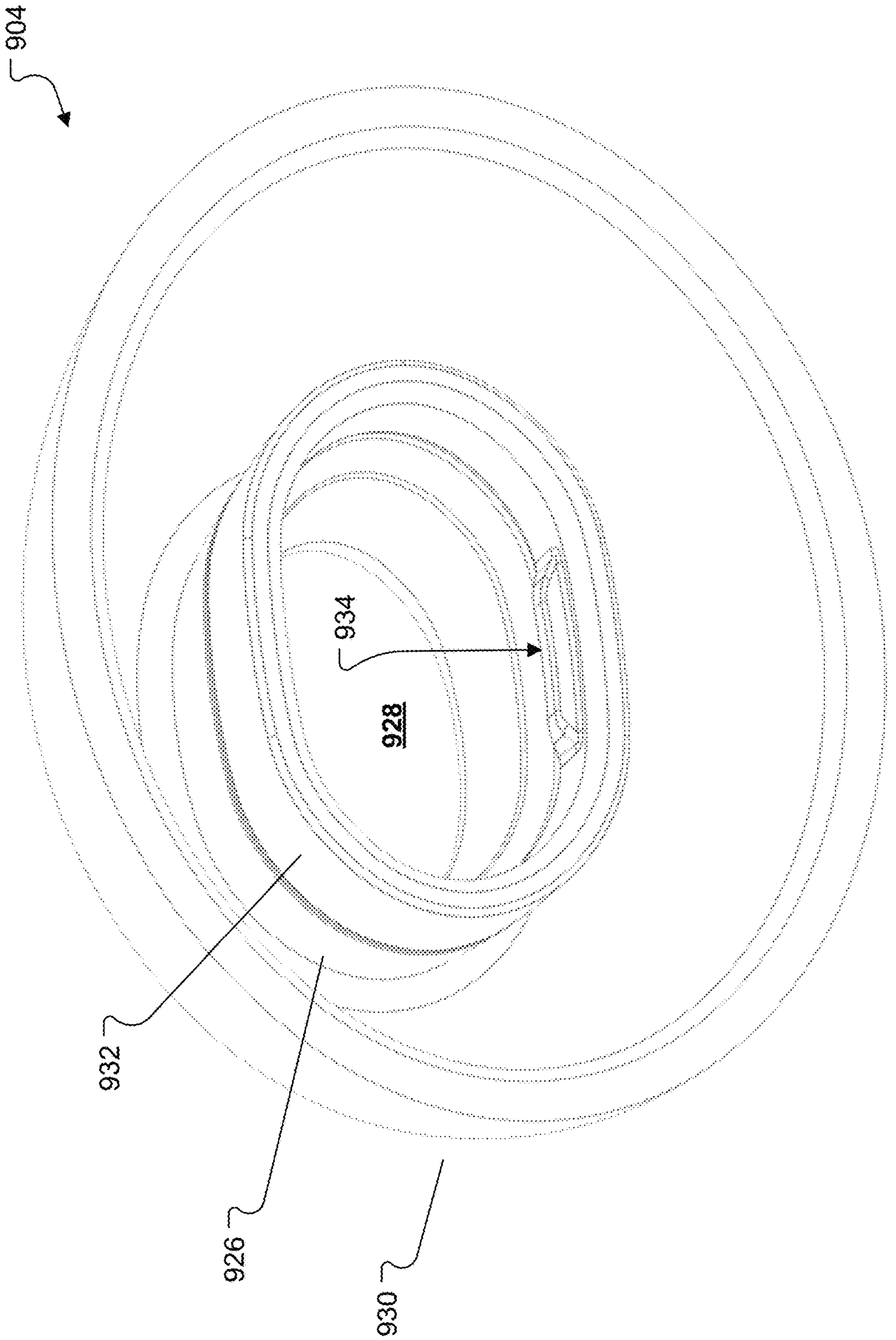
FIG. 9B is a rear perspective view of the ear tip of FIG. 9A.
Figure 9C:
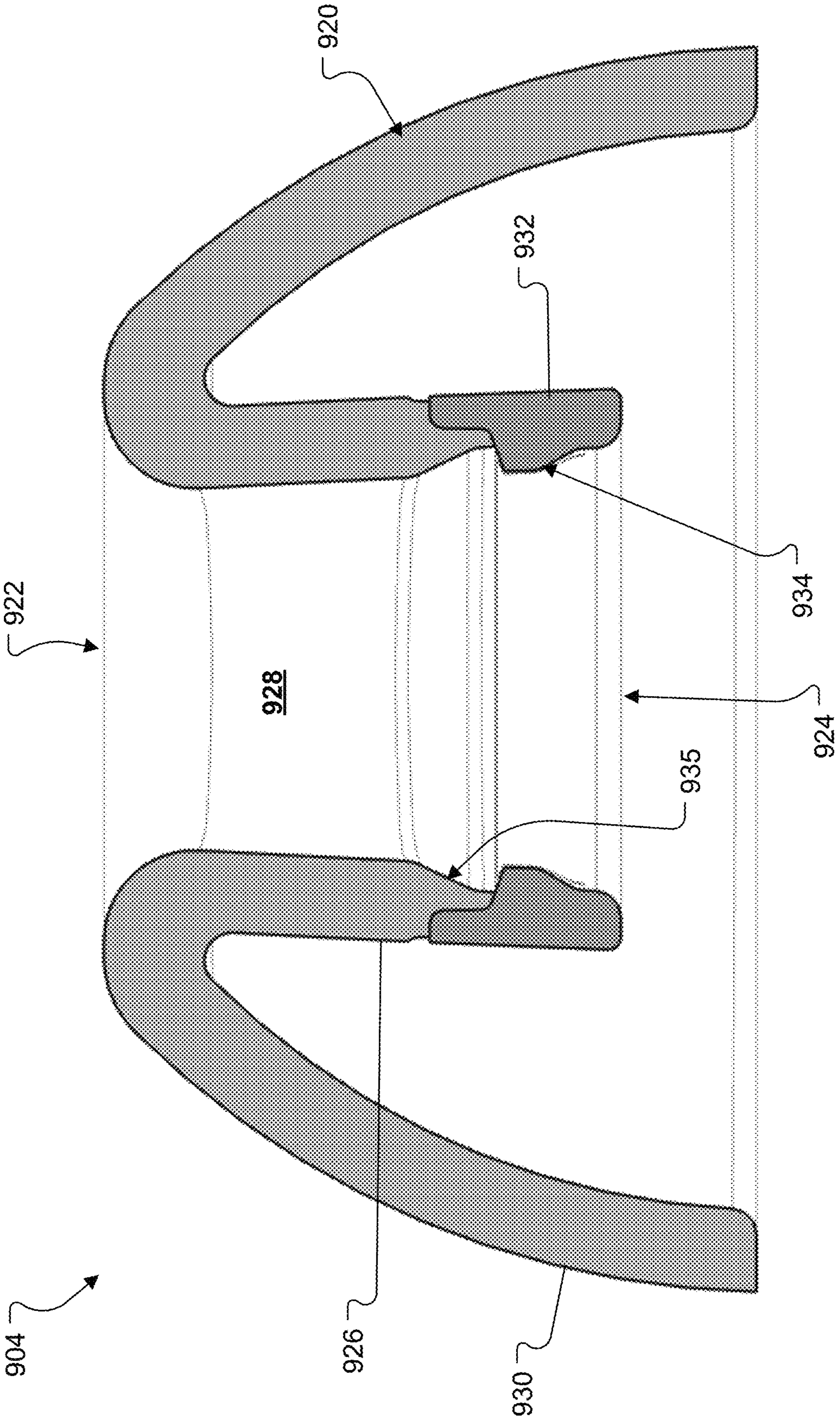
FIG. 9C is a cross-sectional side view of the ear tip of FIG. 9A.

FIGS. 9A through 9D illustrate another implementation of an ear tip 904 that includes a body 920 that is configured to be mounted onto an earbud (e.g., earbud 102, FIGS. 1A & 1B). The body 920 includes a first end 922 and a second end 924 opposite the first end 922. The body 920 further includes inner wall 926 extending between the first end 922 the second end 924. The inner wall 926 defines and surrounds a hollow passage 928 which can be configured to conduct sound waves. The inner wall 926 has an oblong cross-sectional shape, e.g., the shape of an ellipse, an oval, a racetrack (having parallel sides and rounded ends that extend between the parallel sides, a/k/a "stadium"), or an oblong shape with rounded ends and curved splines connecting them as shown in FIG. 9B. Here, "cross-section" or "cross-sectional" should be understood to be normal to the central axis of the inner wall 926. The body 902 also includes an outer wall 930 connected to the inner wall 926 at the first end 922. The outer wall 930 extends away from the inner wall 926 toward the second end 924. In the illustrated example, the outer wall 930 is dome-like in shape; however other shapes, such as a cone, are contemplated. As shown in FIG. 9C, the outer wall 930 extends beyond the second end 924. In alternative implementations, the outer wall 930 may extend toward, but not necessarily reach the second end 924.

The implementation illustrated in FIG. 9A through 9D again makes use of a viscoelastic material with frequency stiffening behavior, such as a styrenic TPE with viscoelastic attributes, e.g., A9 TPE. The viscoelastic material may include any of the surface treatment or compounds discussed above with respect to FIGS. 7A-7D.

Figure 9D:
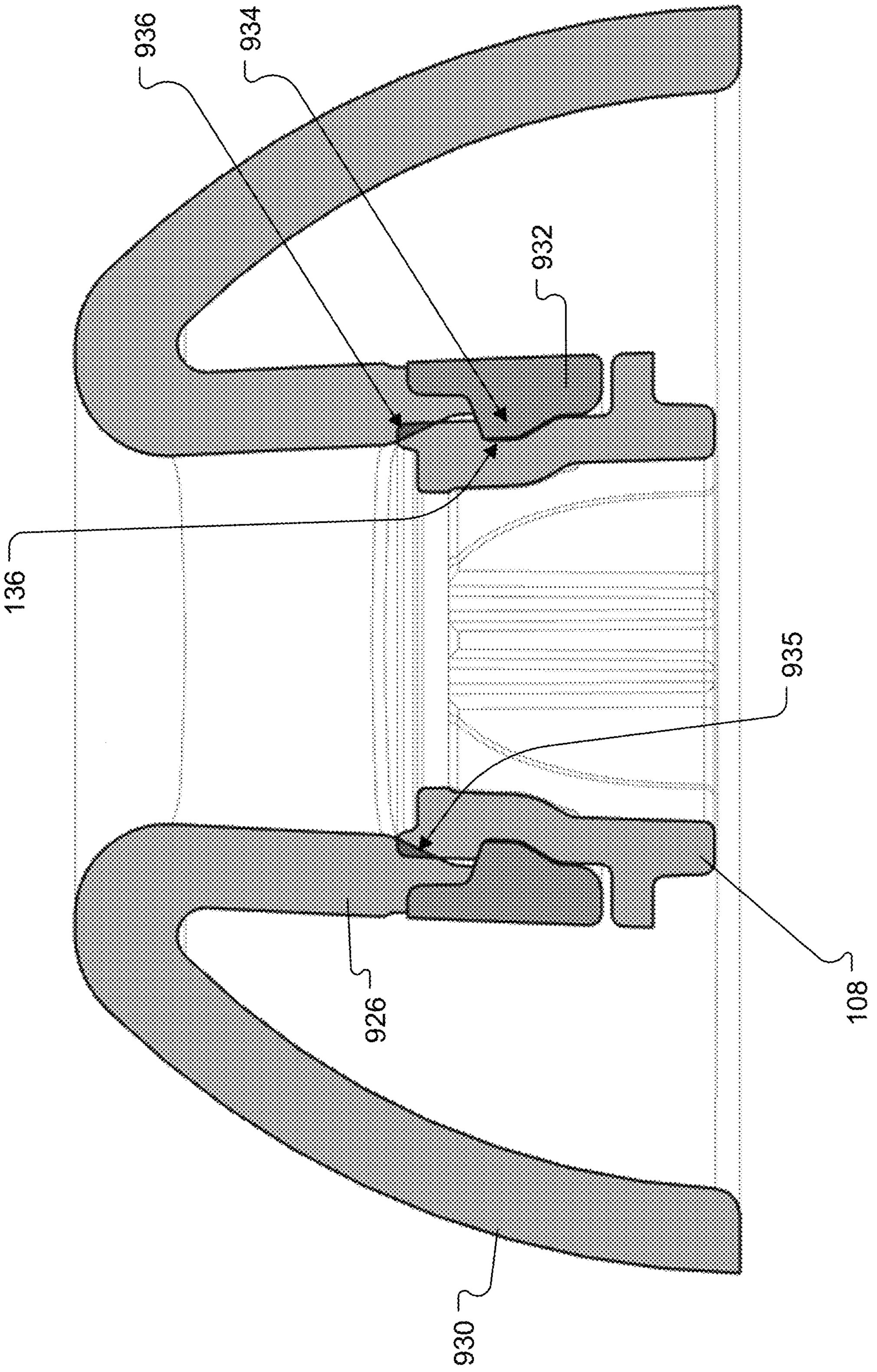
FIG. 9D is a cross-sectional side view of the ear tip of FIG. 9A shown mounted on a nozzle of an earbud.

As shown in FIGS. 9B-9D, the ear tip 904 may include a ring 932 that engages the nozzle 108 for anti-rotation. In that regard, the ring 932 conforms to the oblong shape of the nozzle 108, which inhibits improper mounting of the ear tip 904 once it is mounted on the nozzle 108. As in various implementations described above, the ring 932 may be formed of a rigid plastic, such as glass-filled polyimide. The ring 932 also defines one more retention features 934, e.g., one or more protrusions, that extend outwardly from an inner surface of the inner wall 926 and are configured to engage complimentary retention features 136, e.g., recesses, that are defined by an outer surface of the nozzle 108. The engagement of the retention features 934, 136 helps to retain the ear tip 904 on the nozzle 108.

The viscoelastic material defines a tapered portion 935 of the inner wall 926 that tapers inward, narrowing the hollow passage 928, so as to provide an interference fit with the end of the nozzle 108. The interference 936 between the tapered portion 935 of the inner wall 926 and the nozzle 108 provides a good acoustic seal between the earbud 102 and the ear tip 904.

Figure 10A:
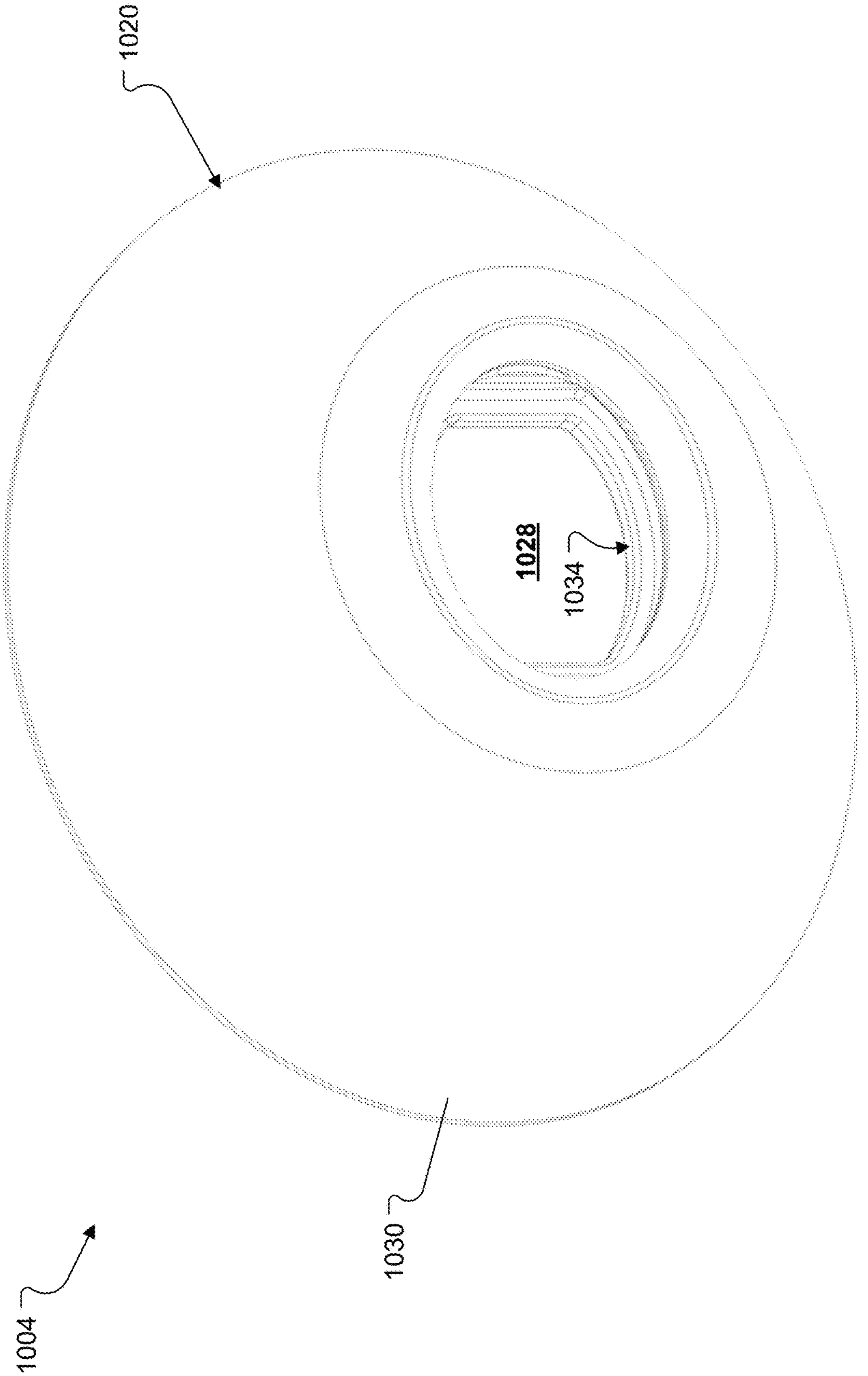
FIG. 10A is a front perspective view of a seventh implementation of an ear tip according to the present disclosure.
Figure 10B:
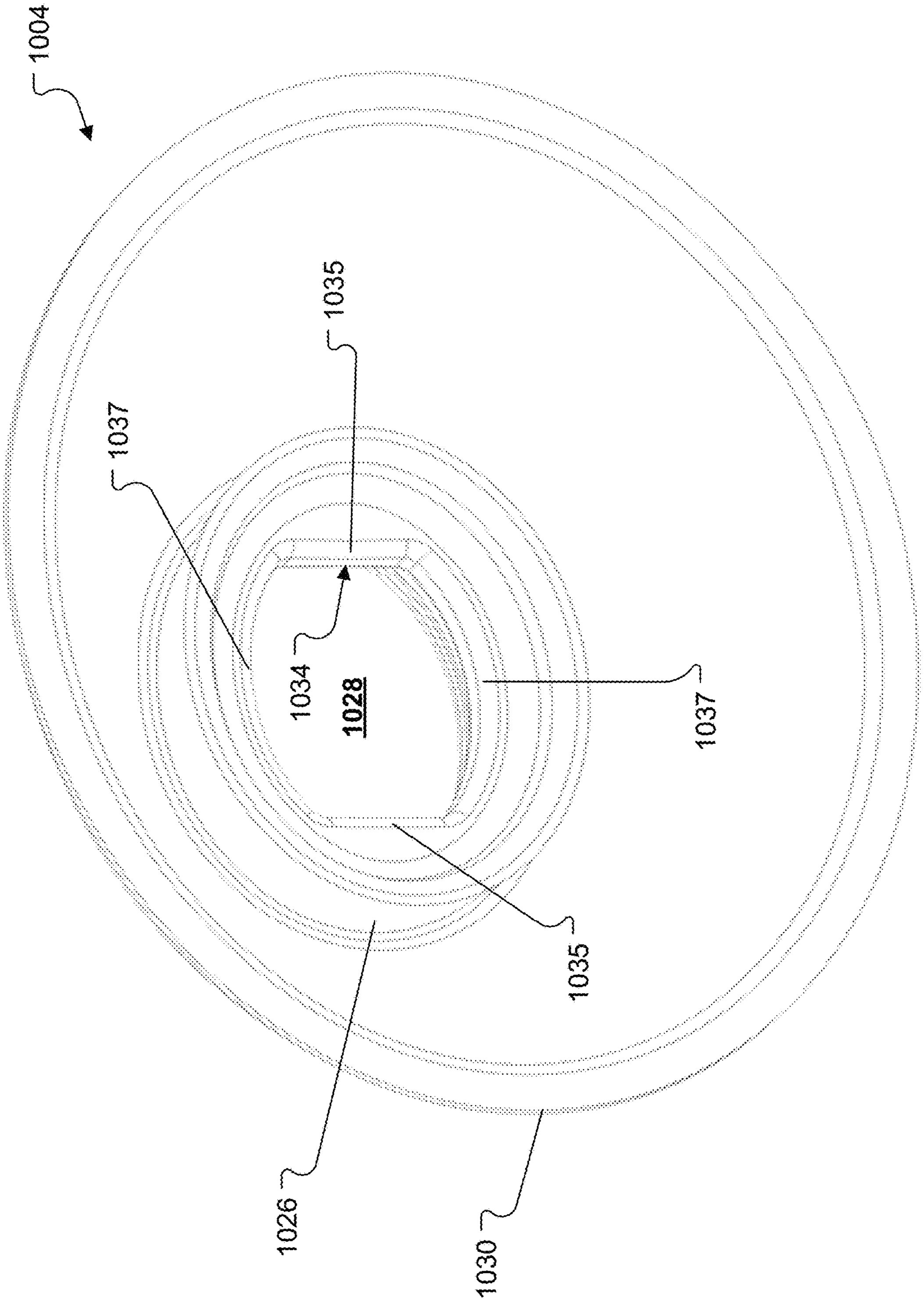
FIG. 10B is a rear perspective view of the ear tip of FIG. 10A.
Figure 10C:
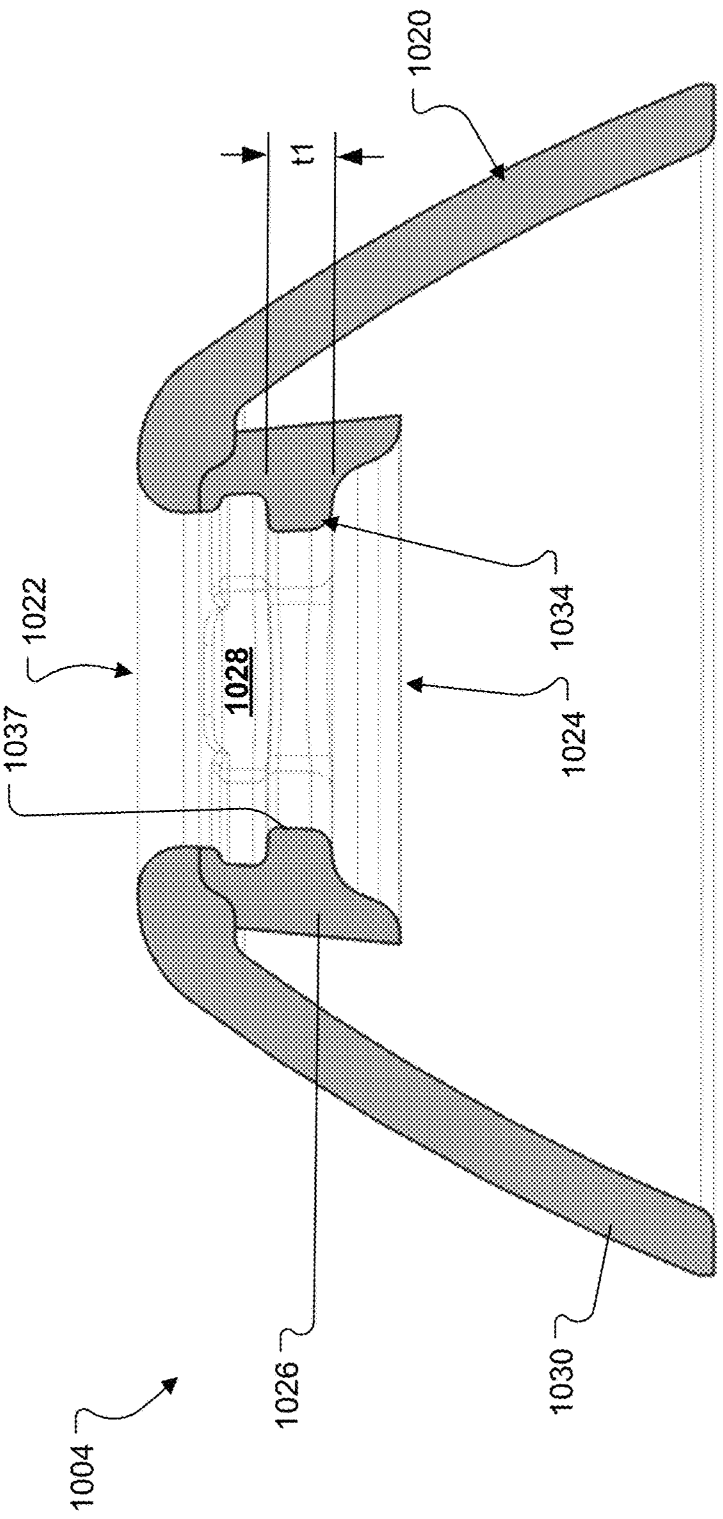
FIG. 10C is a cross-sectional side view of the ear tip of FIG. 10A, taken along the minor axis of the ear tip.
Figure 10D:
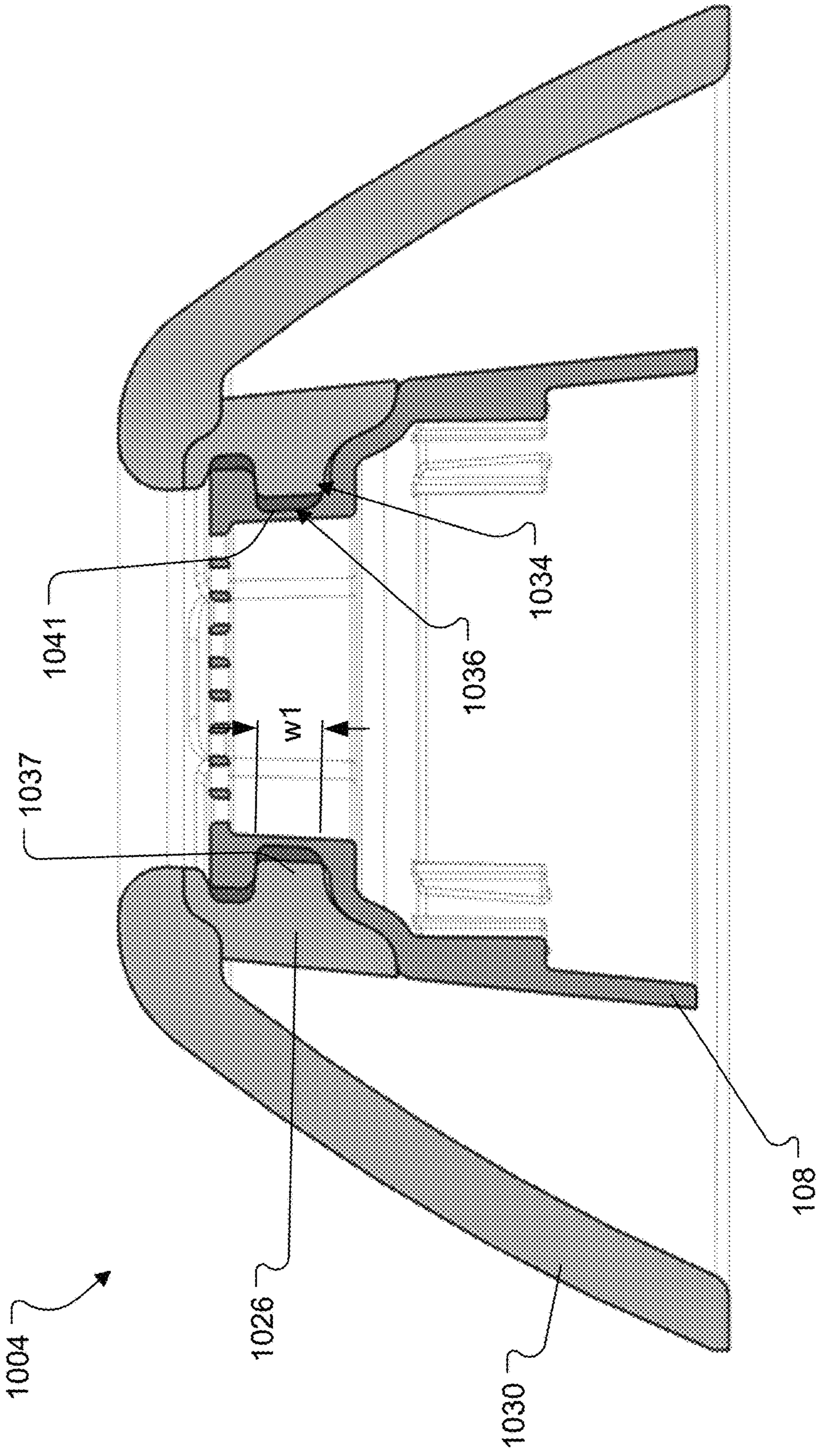
FIG. 10D is a cross-sectional side view of the ear tip of FIG. 10A, taken along the minor axis of the ear tip, shown mounted on a nozzle of an earbud.
Figure 10E:
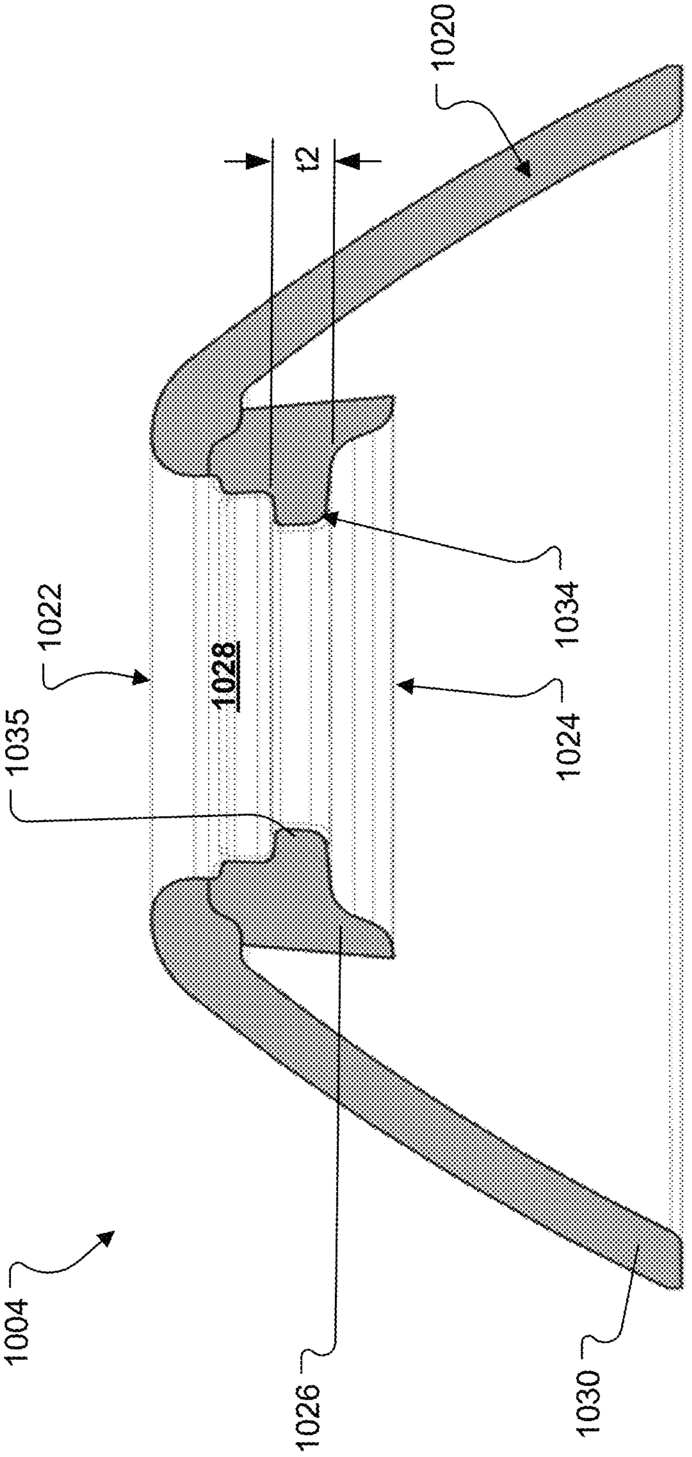
FIG. 10E is a cross-sectional side view of the ear tip of FIG. 10A, taken along the major axis of the ear tip.
Figure 10F:
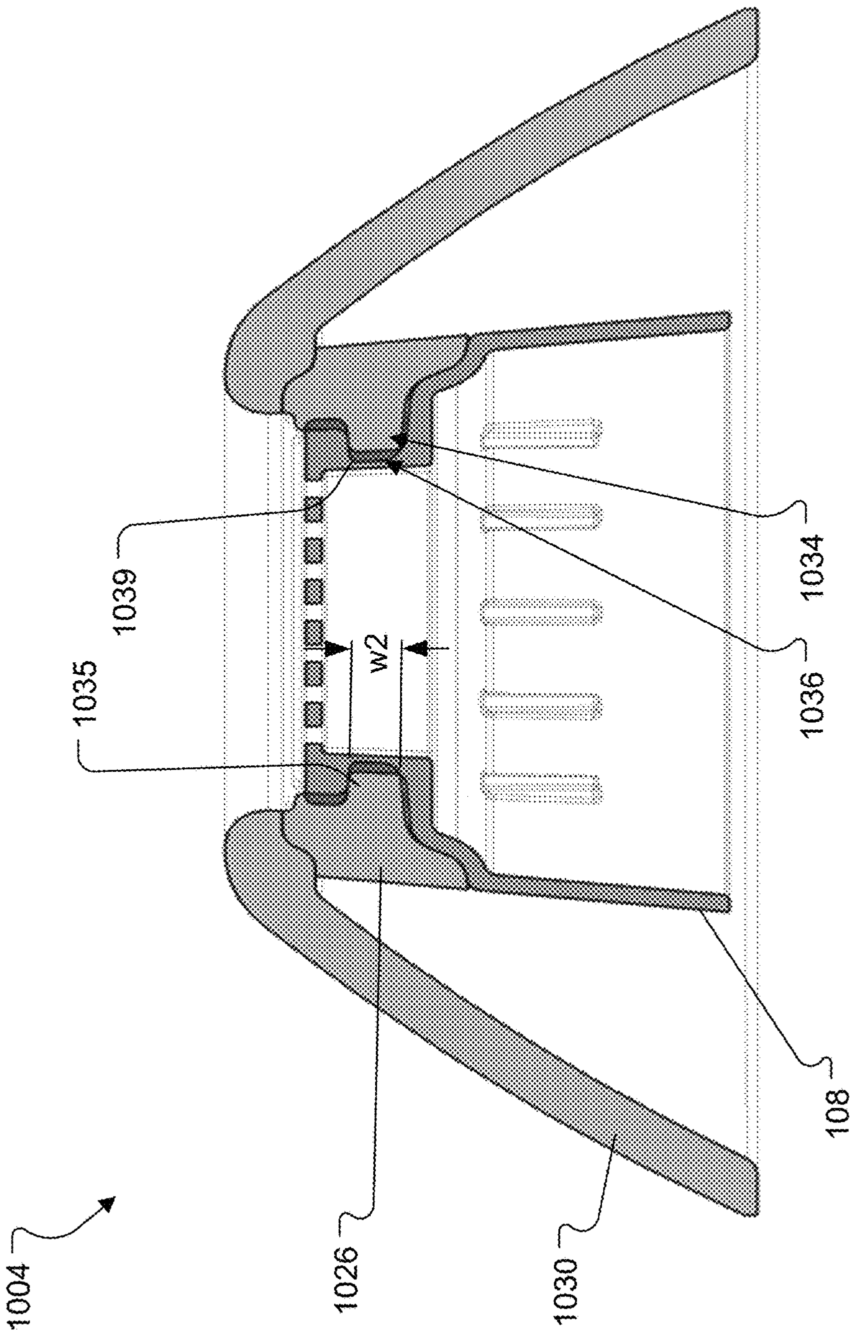
FIG. 10F is a cross-sectional side view of the ear tip of FIG. 10A, taken along the major axis of the ear tip, shown mounted on a nozzle of an earbud.

FIGS. 10A through 10F, illustrate yet another implementation of an ear tip 1004 that is configured to fit at least partially within a person's ear canal. The ear tip 1004 includes a body 1020 that is configured to be mounted onto the earbud 102. The body 1020 includes a first end 1022 and a second end 1024 opposite the first end 1022. The body 1020 further includes inner wall 1026 extending between the first end 1022 the second end 1024. The inner wall 1026 defines and surrounds a hollow passage 1028 which can be configured to conduct sound waves. The inner wall 1026 has an oblong cross-sectional shape, e.g., the shape of an ellipse, an oval, a racetrack (having parallel sides and rounded ends that extend between the parallel sides, a/k/a "stadium"), or an oblong shape with rounded ends and curved splines connecting them as shown in FIG. 10B. Here, "cross-section" or "cross-sectional" should be understood to be normal to the central axis of the inner wall 1026. The body 1020 also includes an outer wall 1030 connected to the inner wall 1026 at the first end 1022. The outer wall 1030 extends away from the inner wall 1026 toward the second end 1024. In the illustrated example, the outer wall 1030 is dome-like in shape; however other shapes, such as a cone, are contemplated. As shown in FIG. 10C, the outer wall 1030 extends beyond the second end 1024. In alternative implementations, the outer wall 1030 may extend toward, but not necessarily reach the second end 1024.

The implementation illustrated in FIGS. 10A-10E makes use of two different materials of differing hardness to form the ear tip 1004, which is formed in a two-shot molding process. A first material, a high durometer compliant material such as a high durometer silicone, e.g., 60 Shore A to 80 Shore A silicone, e.g., 70 shore A silicone, is used to form the inner wall 1026. The first material also defines a retention feature 1034, e.g., a protrusion, that extends around an inner surface of the inner wall 1026 and is configured to engage a complimentary retention feature 1036, e.g., a recess, that is defined by and extends around an outer surface of the nozzle 1008. The engagement of the retention features 1034, 1036 helps to retain the ear tip 1004 on the nozzle 108 and provides a good acoustic seal between the earbud 1002 and the ear tip 1004.

Figure 11:
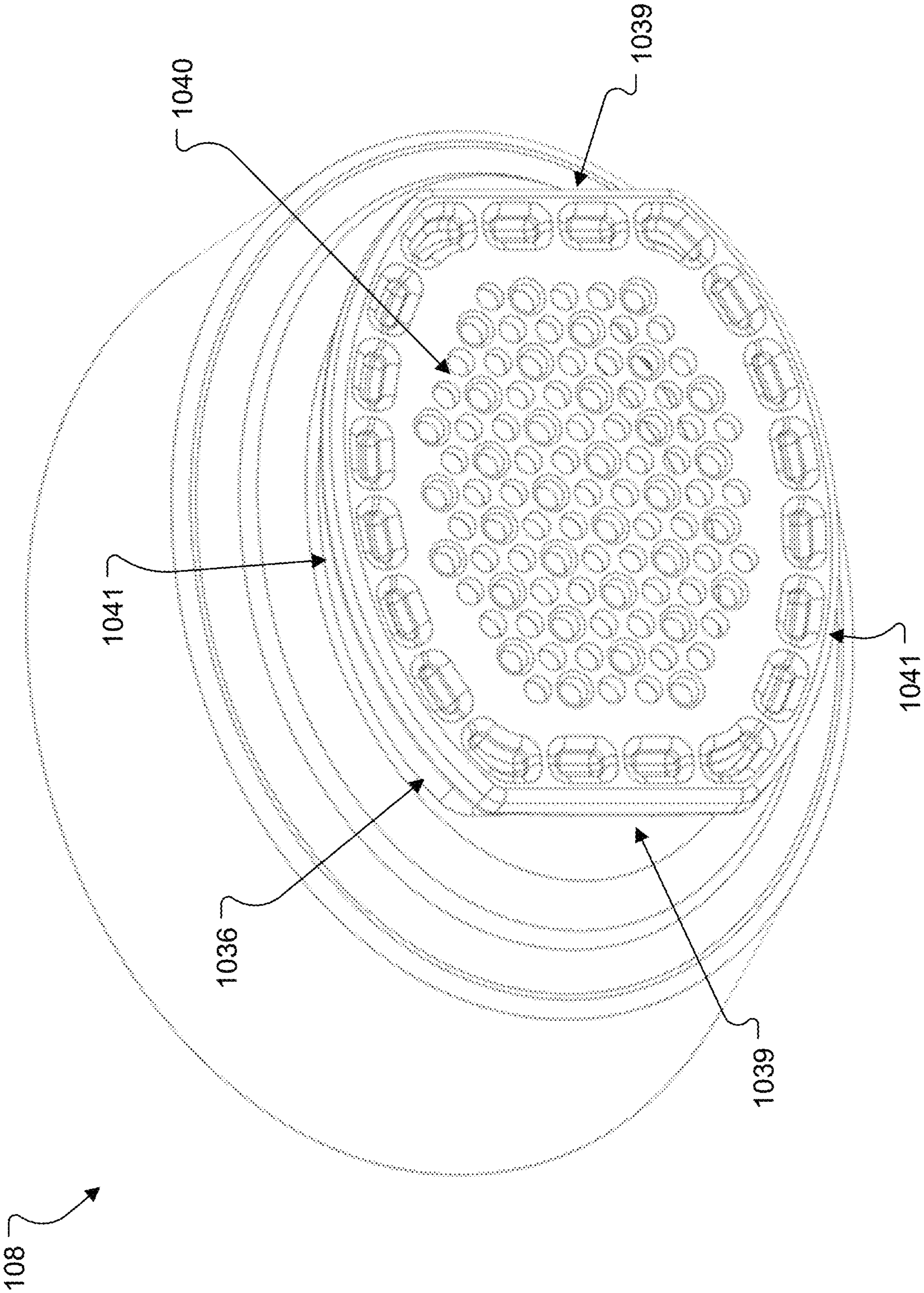
FIG. 11 is a front perspective view of a nozzle for an earbud for use with the ear tip of FIG. 10A.

The retention feature 1034 has two flat end portions 1035 and two curved splines 1037 connecting them. The thickness t1 (FIG. 10C) of the splines 1037 is thicker than a thickness t2 (FIG. 10E) of the end portions 1035. As shown in FIG. 11, the recess 1036 on the nozzle 108 is similarly configured with two flat end portions 1039 and two splines 1041 connecting them. The width w1 (FIG. 10D) of the recess 1036 along the splines 1041 is wider than a width w2 (FIG. 10F) along the flat end portions 1039 to accommodate the additional thickness of the splines 1037 of the protrusion 1034. Similarly, the width w2 of the recess 1036 along the flat end portions 1039 is sized to accommodate the flat end portions 1035 of the protrusion 1034. They respective shapes of the protrusion 1034 and the recess 1036 are thus keyed to one another so as to inhibit improper mounting of the ear tip 1004 on the nozzle 108 and to inhibit rotation of the ear tip 1004 relative to the nozzle 108. The nozzle 108 of FIG. 11 is shown with an integral wax guard 1040.

The outer wall 1030 is molded around the high durometer material. The outer wall 1030 is formed of a lower durometer material, e.g., a low durometer silicone, e.g., 10 Shore A to 30 Shore A silicone, e.g., 20 Shore A silicone, for comfort. The outer wall 1030 is the portion of the ear tip

1004 that contacts and conforms to the user's ear canal to form an acoustic seal therebetween. As shown in FIG. 10A, the outer wall 1030 is in the shape of a dome that has an oblong cross-sectional shape, e.g., the shape of an ellipse, an oval, or a racetrack (having parallel sides and rounded ends that extend between the parallel sides, a/k/a "stadium"). Here, "cross-section" or "cross-sectional" should be understood to be normal to the central axis of the dome/outer wall 1030.

The ear tip 1004 can be formed in a two-shot molding process in which the inner wall 1026 is formed in a first molding step, followed by the outer wall 130 in a second molding step.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. An ear tip comprising:

a body that is configured to be mounted onto an earbud, the body comprising:
- a first end,
- a second end opposite the first end, and
- a first wall extending between the first end and the second end, the first wall defining and surrounding a hollow passage configured to conduct sound waves,
- wherein the first wall is configured to engage a nozzle on the earbud,
- wherein the first wall comprises a ring, formed of a rigid material, that engages the nozzle, and
- wherein the ring comprises at least one C-shaped member with at least one gap,
- wherein the C-shaped member conforms to an oblong shape of the nozzle, which inhibits improper mounting of the ear tip on the nozzle and inhibits rotation of the ear tip relative to the nozzle once it is mounted on the nozzle, and
- wherein a compliant material is molded around the ring and fills the gap.

2. The eartip of claim 1, further comprising a second wall connected to the first wall at the first end and extending away from the first wall toward the second end.

3. The eartip of claim 2, wherein the second wall is in the shape of a dome that has an oblong cross-sectional shape.

4. The eartip of claim 2, wherein the first wall further comprises an extension that extends between the nozzle and the first end of the ear tip, and wherein the second wall and the extension are formed at least partially of a viscoelastic material with frequency stiffening behavior.

5. The eartip of claim 4, wherein the extension and the second wall are formed of a styrenic TPE with viscoelastic attributes.

6. The ear tip of claim 4, wherein an outer surface of the second wall is treated with a surface treatment selected from an E-beam processing and photoionization for improved sebum resistance.

7. The ear tip of claim 4, wherein an outer surface of the second wall has a soft touch coating.

8. The ear tip of claim 7, wherein the soft touch coating comprises a 50% poly(styrene-isobutylene-styrene) (SIBS) block copolymer/50% silicone (wt/wt) soft touch coating.

9. The ear tip of claim 4, wherein the viscoelastic material comprises a composition including an elastomer and one or more phase change materials having a phase change ability from solid to liquid state at a predetermined phase-change temperature.

10. The ear tip of claim 9, wherein the predetermined phase-change temperature is about 25° C. to about 35° C.

11. The ear tip of claim 9, wherein the composition has a hardness of about 5 Shore A to about 50 Shore A, and the amount of the phase change material in the composition is about 10% to about 40% by weight.

12. The ear tip of claim 1, wherein the compliant material is a high durometer compliant material.

13. The ear tip of claim 12, wherein the high durometer compliant material has a durometer of 60 Shore A to 80 Shore A.

14. The ear tip of claim 12, wherein the high durometer compliant material defines at least part of an extension that extends between the nozzle and the first end of the ear tip.

15. The ear tip of claim 14, further comprising a second wall connected to the first wall at the first end and extending away from the first wall toward the second end, wherein the second wall is formed of a low durometer compliant material.

16. The ear tip of claim 15, wherein the low durometer compliant material is molded around the high durometer compliant material.

17. The ear tip of claim 16, wherein the low durometer compliant material has a durometer of 10 Shore A to 30 Shore A.

18. The ear tip of claim 15, wherein the ring is formed of a rigid plastic.

19. The ear tip of claim 12, wherein the ring comprises a pair of C-shaped members arranged with a pair of gaps between the members, and wherein the high durometer compliant material fills both gaps.

20. The ear tip of claim 12, wherein the high durometer compliant material defines a retention member that is configured to engage a mating retention member on the nozzle.

21. The ear tip of claim 1, wherein the first wall has an oblong cross-sectional shape.

22. The ear tip of claim 1, wherein the C-shaped member extends only partially around a perimeter of the first wall.

* * * * *